(12) United States Patent
Watanabe et al.

(10) Patent No.: US 8,149,666 B2
(45) Date of Patent: Apr. 3, 2012

(54) OPTICAL DISC APPARATUS

(75) Inventors: Katsuya Watanabe, Nara (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 12/578,644

(22) Filed: Oct. 14, 2009

(65) Prior Publication Data

US 2010/0097906 A1    Apr. 22, 2010

(30) Foreign Application Priority Data

Oct. 16, 2008    (JP) .................................. 2008-267026

(51) Int. Cl.
*G11B 20/18*    (2006.01)

(52) U.S. Cl. ................. 369/53.2; 369/44.32; 369/47.14; 369/94; 369/53.15; 369/53.17

(58) Field of Classification Search ............... 369/44.32, 369/47.14, 53.15, 53.17, 53.2, 94
See application file for complete search history.

(56) References Cited

U.S. PATENT DOCUMENTS

| | | | |
|---|---|---|---|
| 6,240,054 B1 * | 5/2001 | Takeya et al. | 369/44.29 |
| 6,822,936 B2 * | 11/2004 | Ono et al. | 369/53.23 |
| 2006/0256692 A1 * | 11/2006 | Mamiya | 369/94 |
| 2008/0080345 A1 * | 4/2008 | Hasegawa | 369/53.2 |
| 2008/0159100 A1 * | 7/2008 | Hirotsune et al. | 369/53.17 |
| 2009/0175140 A1 * | 7/2009 | Nakamura et al. | 369/47.14 |
| 2010/0260026 A1 * | 10/2010 | Ishikawa et al. | 369/94 |

FOREIGN PATENT DOCUMENTS

| | | |
|---|---|---|
| JP | 2006-179136 | 7/2006 |
| JP | 2009-181614 | 8/2009 |

OTHER PUBLICATIONS

Co-pending U.S. Appl. No. 12/193,072, filed Aug. 18, 2008.
Notice of Reasons for Rejection for corresponding Japanese Application No. 2009-227813 issued Feb. 8, 2011 and English translation.
Co-pending U.S. Appl. No. 12/739,973, filed Apr. 27, 2010.
Co-pending U.S. Appl. No. 12/738,983, filed Apr. 21, 2010.

* cited by examiner

*Primary Examiner* — Wayne Young
*Assistant Examiner* — Brenda Bernardi
(74) *Attorney, Agent, or Firm* — Renner, Otto, Boisselle & Sklar, LLP

(57) ABSTRACT

An optical disc apparatus according to the present invention includes a disc type recognizing section for determining whether the optical disc loaded is a first type, of which the number of information storage layers is less than a setting T (where T is an integer that is greater than two), or a second type, of which the number of information storage layers is equal to or greater than the setting T. Depending on whether the optical disc loaded has turned out to be the first type or the second type, the apparatus determines the read/write preprocessing (such as whether a fingerprint detection process needs to be performed or not).

14 Claims, 12 Drawing Sheets

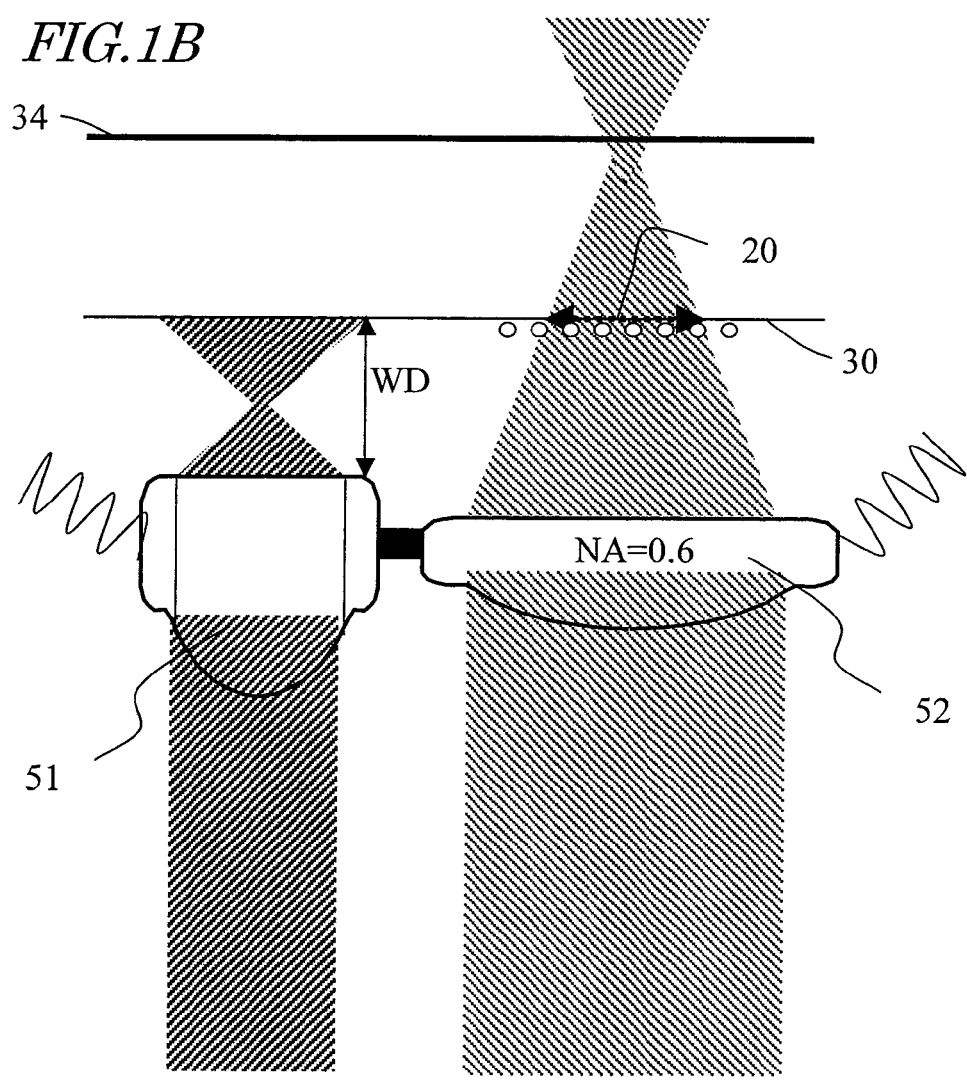

(b) INTENSITY OF LIGHT REFLECTED FROM DVD (c) INTENSITY OF LIGHT REFLECTED FROM BD (a)

(b)

(c)

(d)

(e)

(f)

OPTICAL DISC APPARATUS

TECHNICAL FIELD

The present invention relates to a recorder/player for a single-sided, single-layer optical disc that has only one information storage layer or a single-sided, multi-layer optical disc that has a number of information storage layers stacked. More particularly, the present invention relates to an optical disc apparatus that can read and/or write data from/on a multilayer optical disc (such as a BD (Blu-ray Disc) with 16 or 20 information storage layers) by irradiating it with a blue-violet laser beam with a wavelength of about 405 nm through an objective lens with as high an NA (numerical aperture) as 0.85 or more.

It should be noted that the present invention is in no way limited to such a BD recorder/player but could be used extensively to any other type of optical disc apparatus that reads and/or writes data using a laser beam with a wavelength of approximately 405 nm or 400 nm or less. As used herein, the term "optical disc apparatus" will refer to not just an "optical disc drive" that could form part of the storage device of a computer or a camera but also a "server" that could be used in combination with a computer network and a "recorder" for recording audiovisual data.

BACKGROUND ART

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by an evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits, the depth of the tracks and the thickness of the recording material film are smaller than the thickness of the optical disc base material. For that reason, those portions of the optical disc, where data is stored, define a two-dimensional plane, which is sometimes called a "storage plane" or an "information plane". However, considering that such a storage plane actually has a physical dimension in the depth direction, too, the term "storage plane (information plane)" will be replaced herein by another term "information storage layer". Every optical disc has at least one such information storage layer. Optionally, a single information storage layer may actually include a plurality of layers such as a phase-change material layer and a reflective layer.

Also, in this description, the "information storage layer" will sometimes be referred to herein as just a "layer" for the sake of simplicity. Thus, a single optical disc with N "information storage layers" that are stacked one upon the other will be referred to herein as an "N-layer optical disc". For example, a BD with two information storage layers will be simply referred to herein as a "dual-layer (which means "two-layer") BD".

In high-density optical discs such as BDs that are sometimes called "next-generation DVDs", at least one information storage layer is supported on a substrate and the light incident surface of the information storage layer is covered with a thin protective coating (which is a light-transmitting layer). If a number of information storage layers are stacked one upon the other, then another light-transmitting layer is interposed between each pair of those information storage layers. The depth of an information storage layer in question (i.e., the information storage layer at which the focus of a light beam is currently located) as measured from the light incident surface of such an optical disc (which will be simply referred to herein as "the surface of an optical disc") is typically 100 µm or less. In this description, the depth of each information storage layer as measured from the light incident surface of an optical disc will sometimes be referred to herein as "the light-transmitting layer thickness" of the information storage layer in question.

To read data that is stored on an optical disc or to write data on a rewritable optical disc, the light beam always needs to maintain a predetermined converging state on a target track on a target information layer. For that purpose, a "focus control" and a "tracking control" are required. The "focus control" means controlling the position of an objective lens perpendicularly to the information storage layer (which direction will be referred to herein as a "substrate depth direction") such that the focus position (or focal point) of the light beam is always located on the information storage layer. On the other hand, the "tracking control" means controlling the position of the objective lens along the radius of an optical disc loaded (which direction will be referred to herein as a "disc radial direction") such that the light beam spot is always located right on a target track.

To get the focus control and tracking control done, a focus error or a tracking error needs to be detected based on the light reflected from an optical disc and the location of the light beam spot needs to be adjusted so as to minimize the error. The magnitudes of the focus error and the tracking error are respectively represented by a "focus error (FE) signal" and a "tracking error (TE) signal" that are generated based on the light reflected from the optical disc.

Once a fingerprint is left on the surface of an optical disc, the intensity of the reflected light will decrease when the light beam passes through that fingerprint. As a result, the intensity distribution of the light beam will decrease non-uniformly, thus causing a disturbance in the TE signal and producing tracking abnormality. Consequently, some type of tracking failure such as a track jump happens. Various techniques have been proposed so far to avoid such tracking failures. For example, according to Japanese Patent Application Laid-Open Publication No. 2006-179136, the decrease in the intensity of the reflected light is detected on a regular basis, and if any defect, including the presence of a fingerprint, has been detected, the user is notified of that, thereby avoiding predictable write failures. Meanwhile, if the user permits such a soiled disc, a read/write operation will be performed on it just as instructed by him or her. Furthermore, by providing means for avoiding a repetitive notification, an opportunity to perform a read/write operation just as planned can be guaranteed while avoiding write failures to be caused by the dirt on the disc.

Meanwhile, as infrastructures to implement terrestrial digital broadcasting have been rapidly set up and as TV sets with a reduced thickness and a huge screen have become more and more popular among general consumers, there are growing demands for digital high definition TV broadcasting with high image quality. Considering these circumstances, it is expected that the mainstream storage media will soon change from DVDs into BDs. Digital broadcasts of high quality are transmitted in an MPEG-TS compression format at a transfer rate of 16 to 24 Mbps, which is higher than that of conventional analog broadcasts. A broadcast with that high transfer rate could be recorded for only about 20 minutes on a DVD but for 4.5 to 6 hours on a dual-layer BD with a storage capacity of 50 GB. Recently, to further extend the maximum recording duration, multilayer BDs in which three or more information storage layers are stacked one upon the other have been researched and developed extensively. For example, it has been either made official or proposed in articles that three- to six-layer BDs (with a storage capacity of 200 GB) and 16- and 20-layer BDs (with a storage capacity of 500 GB) are under development. If such multilayer optical discs, of which the number N of information storage layers stacked is three or more, are realized, sufficiently long recording duration can be ensured by just a single BD even without building in a hard disk.

CITATION LIST

Patent Literature

Patent Document No. 1 Japanese Patent Application Laid-Open Publication No. 2006-179136

SUMMARY OF INVENTION

Technical Problem

In the prior art, not just the fingerprints but also various other defects such as dirt, grazes, scratches and dust on an optical disc are detected by sensing a decrease in the amplitude of a reflected light intensity (which will be referred to herein as an "RF amplitude"). That is to say, no matter what type of defect has been detected, the user is just notified of the presence of a defect on the disc. And he or she has no choice but to replace the disc with such a defect with another one.

However, in a situation where a scheduled recording operation is carried out while the user is away from home or after he or she has gone to bed at night with the recording schedule entered, even if the recorder tries to notify the user of the defect, he or she cannot replace the optical disc. In that case, the recorder cannot help either continuing the write operation on the optical disc, on which the defect has been detected, at the expense of the quality of the data stored, or stopping the write operation with an error message displayed. That is why it is difficult to record a TV program with long running time, such as a telecast of an Olympics game or one entire series of soap opera, directly on a multilayer without using a HDD.

Among other things, a BD is far more sensitive to scratches and fingerprints than a DVD is. Nevertheless, a BD is standardized as a bare optical disc. That is why even if only a tiny fingerprint were left accidentally on a brand-new BD that has just been removed from its case while it is loaded into a drive, a track jump or a write error would still be caused by the fingerprint. What is worse, a fingerprint left on a BD could prevent the user from either writing data on it as intended or even reading data from it. As a matter of fact, results of experiments also revealed that a BD with a fingerprint had a significantly decreased RF amplitude and that a BD was much more sensitive to fingerprints than a DVD was. These results are quite understandable considering how a BD works in principle.

In a dual-layer BD, each information storage layer has a reflectance of 4% or less. However, if the number of information storage layers stacked in a single optical disc was further increased, the reflectance of each of those information storage layers would decrease to 3% or less due to optical loss. And if further loss were caused due to the presence of a fingerprint, then almost no signal amplitude could be obtained to aggravate the problem. On top of that, although a dual-layer BD has a light-transmitting layer thickness of 75 μm, a 16-layer BD would have as small a light-transmitting layer thickness as approximately 20 μm according to the current status of experiments. In that case, the closer to the surface a given information storage layer is, the broader the area of that information storage layer to be affected by the presence of a fingerprint for a beam spot of the same size at the surface. What is worse, the servo signals would also be affected and track jumps would happen when the beam spot passes through such an area with a fingerprint during reading or writing.

As can be seen, the greater the number of information storage layers stacked in a single optical disc, the more significantly the disc would be affected by a fingerprint left there. To overcome such a problem, it has been proposed that when loaded with an optical disc, an optical disc apparatus always search the disc for any fingerprint and that if any fingerprint has been detected, cleaning be done to wipe the fingerprint away. However, it will usually take a lot of time to get such a search for fingerprints done.

It is therefore an object of the present invention to provide an optical disc apparatus that can perform fingerprint detection and other processes efficiently when not just conventional single-layer and dual-layer optical discs but also multilayer optical discs become immensely popular in the near future.

Solution to Problem

An optical disc apparatus according to the present invention includes: a motor for rotating an optical disc loaded; a light source for emitting a light beam; a lens for converging the light beam onto the optical disc; and a control section for controlling the operations of the motor, the light source, and the lens. The control section performs read/write preprocessing before starting to read or write data from/on the optical disc. The control section includes a disc type recognizing section for determining, by irradiating the optical disc with the light beam using the light source and the lens, whether the optical disc loaded is a first type, of which the number of information storage layers is less than a setting T (where T is an integer that is greater than two), or a second type, of which the number of information storage layers is equal to or greater than the setting T. The control section decides what to do as the read/write preprocessing depending on whether the optical disc loaded has turned out to be the first type or the second type.

In one preferred embodiment, the preprocessing includes a defect search. If the optical disc loaded has turned out to be the first type, the control section does not perform the defect search. But if the optical disc loaded has turned out to be the second type, the control section does perform the defect search.

In another preferred embodiment, the preprocessing includes startup learning. If the optical disc loaded has turned out to be the first type, the control section carries out the startup learning on every information storage layer of the optical disc loaded. But if the optical disc loaded has turned out to be the second type, the control section carries out the startup learning on only selected one(s) of the information storage layers of the optical disc loaded.

In this particular preferred embodiment, if the optical disc loaded has turned out to be the second type, the control section selects at least one of the information storage layers of that optical disc, where data needs to be written, according to the size of the data to be written on the optical disc, and carries out the startup learning on the at least one information storage layer on which the data needs to be written.

In still another preferred embodiment, the preprocessing is a process for determining which of first and second writing modes, which will result in two different data storage densities, needs to be adopted to write data. If the optical disc loaded has turned out to be the first type, the control section decides to write the data in the first writing mode. But if the optical disc loaded has turned out to be the second type, then the control section writes the data in one of the first and second writing modes that has been selected by the user of the apparatus.

In this particular preferred embodiment, if the optical disc loaded has turned out to be the second type and if the data needs to be written in the first writing mode, then the data is written on at least one of the information storage layers of the second type of optical disc that is associated with the information storage layer(s) of the first type of optical disc.

In yet another preferred embodiment, the disc type recognizing section determines the type of the optical disc loaded before the startup learning is carried out on the information storage layer.

In yet another preferred embodiment, when the defect search is performed, a fingerprint detection process is carried out to determine whether or not any fingerprint is present on the surface of the optical disc loaded.

In this particular preferred embodiment, the optical disc apparatus further includes an internal memory that stores results of the fingerprint detection process. If the apparatus has been turned OFF without ejecting the optical disc loaded, the results of the fingerprint detection process are stored in the memory and will be used when the apparatus is turned ON again, thereby omitting the fingerprint detection process.

In an alternative preferred embodiment, if the optical disc loaded has already been wiped in advance in a cleaning mode, then the apparatus determines, by checking a cleaning protect flag that has been recorded on the optical disc, whether or not the optical disc needs to be further wiped and omits the fingerprint detection process if the disc no longer needs to be wiped.

In another preferred embodiment, if the fingerprint detecting section has confirmed the presence of a fingerprint on the optical disc, the user is alerted to the presence either visually or audibly.

In still another preferred embodiment, the optical disc apparatus further includes a fingerprint wiping section. If the fingerprint detecting section has confirmed the presence of a fingerprint on the optical disc, the fingerprint wiping section wipes the fingerprint away.

In yet another preferred embodiment, the optical disc apparatus further includes a writing section. If the fingerprint detecting section has detected a fingerprint on a management area of the optical disc, the writing section stores data that should be written on the management area somewhere else where there are no fingerprints.

In this particular preferred embodiment, the fingerprint wiping section includes a retractable brush and wipes the fingerprint away with the brush sticking out while cleaning the disc.

Advantageous Effect of Invention

An optical disc apparatus according to the present invention determines whether the optical disc loaded is a first type, of which the number of information storage layers is less than a setting T (where T is an integer that is greater than two), or a second type, of which the number of information storage layers is equal to or greater than the setting T, and decides what to do as read/write preprocessing depending on whether the optical disc loaded has turned out to be the first type or the second type. For example, in a preferred embodiment, supposing the setting T is two, if the optical disc loaded has turned out to be a multilayer optical disc with three or more information storage layers, defect detection is carried out as the read/write preprocessing. However, if the optical disc loaded has turned out to be a single-layer or dual-layer optical disc, then the defect detection may be skipped. In this manner, by changing what to do as the preprocessing depending on whether the number of information storage layers stacked is greater than a predetermined setting T or not, unnecessary preprocessing can be omitted and it will take a much shorter time for the optical disc apparatus to get ready to perform a read/write operation on the optical disc loaded.

BRIEF DESCRIPTION OF DRAWINGS

FIG. 1 FIGS. 1A and 1B are schematic representations of an optical pickup illustrating a principle of fingerprint detection on a BD.

DESCRIPTION OF EMBODIMENTS

Since a BD requires a greater NA and a thinner light-transmitting layer (i.e., a cover layer), a BD is more sensitive to dust, dirt, and fingerprints, among other things, which have been deposited or left on the surface of the disc. Speaking of fingerprints, a fingerprint left on a DVD would just act as a single defect that would have only limited influence on the entire beam spot on the information storage layer, thus raising no big problems. In BDs, on the other hand, the beam spot on the information storage layer has so small a size that each of a great many dots that form the fingerprint would vary the amplitude of a light intensity signal (i.e., an RF amplitude) significantly. That is why in a BD, the signal quality is easily affected seriously by a fingerprint. Stated otherwise, however, an optical disc apparatus designed to process BDs can sense the presence of, and detect the location of, a fingerprint both easily and accurately based on the waveform of the RF amplitude.

Hereinafter, it will be described how in principle a fingerprint is detected according to the present invention.

Figure 1A:
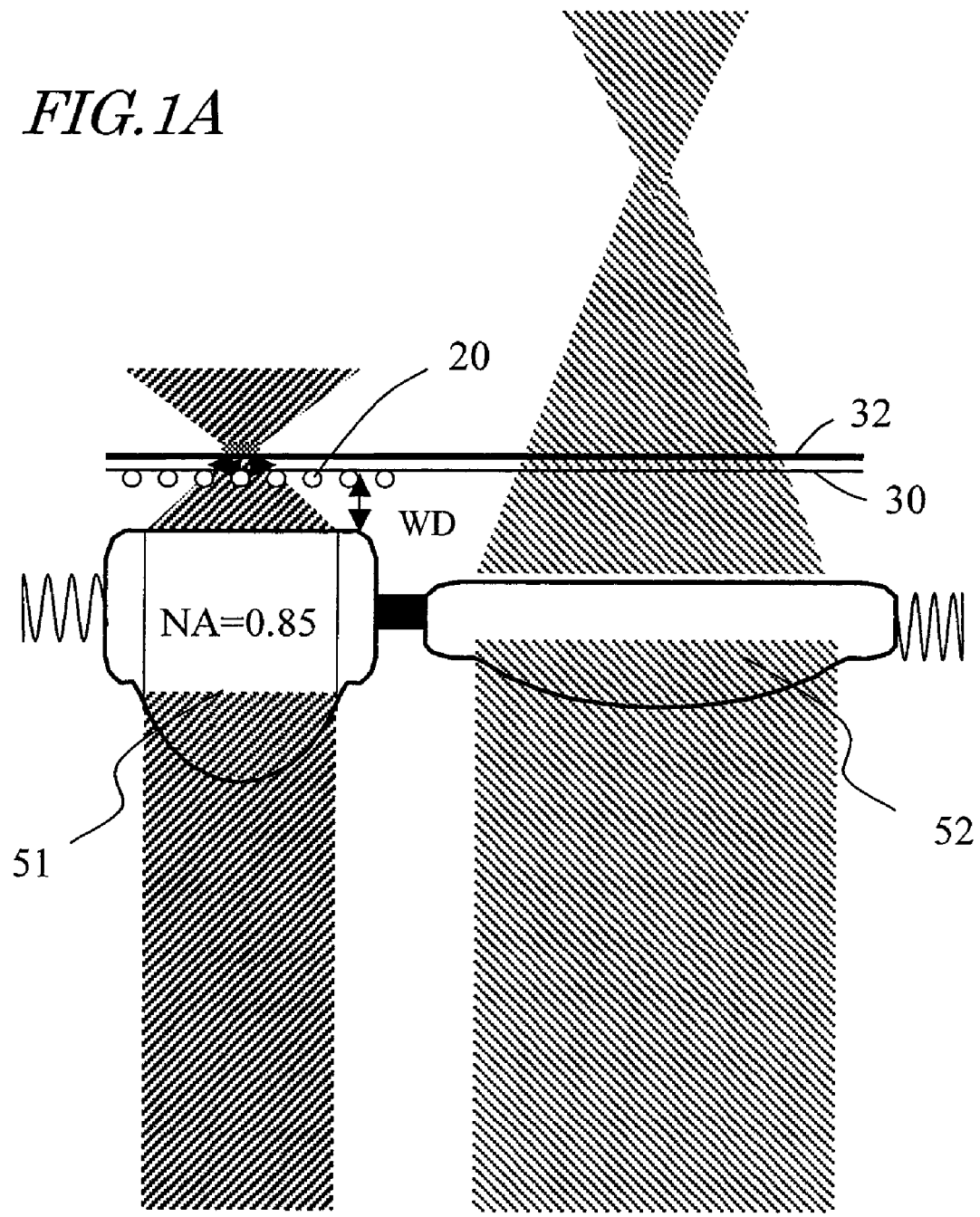

First, look at FIGS. 1A and 1B, which are cross-sectional views schematically illustrating how an optical pickup with a BD lens 51 and a DVD lens 52 focuses a light beam on information storage layers 32 and 34 of optical discs. Specifically, FIG. 1A illustrates how the BD lens 51 focuses the light beam on a BD's information storage layer 32, while FIG. 1B illustrates how the DVD lens 52 focuses the light beam on a DVD's information storage layer 34. In FIGS. 1A and 1B, WD stands for a working distance, which is the distance from the upper surface of the objective lens 51 or 52 to the surface 30 of the optical disc. In reading or writing data from/on the BD's information storage layer 32, the WD is adjusted to be approximately 0.3 mm. On the other hand, in reading or writing data from/on the DVD's information storage layer 34, the WD is adjusted to be approximately 1.0 mm. In the optical discs shown in FIGS. 1A and 1B, multiple fingerprint dots 20 are left on the surface 30 thereof.

As shown in FIGS. 1A and 1B, the light beam spot on the BD has been converged more narrowly than the one on the DVD.

The diameter of the light beam spot on an information storage layer corresponds to a "limit of diffraction" to be determined by an NA and a wavelength. That is why the light beam spot on the DVD's information storage layer 34 has a diameter of approximately 0.9 µm to 1.0 µm, whereas the light beam spot on the BD's information storage layer 32 has a diameter of approximately 0.3 µm to 0.4 µm. The effective beam cross section on the BD is about a quarter to one fifth as large as the cross section on the DVD.

Next, the spot diameter at the surface 30 of the BD is calculated. $NA = n \sin \theta$ is satisfied. That is why supposing $NA=0.85$ and the refractive index n of the cover layer is 1.5, then $0.85 = 1.5 \times \sin \theta$ is satisfied. Thus, the angle of incidence $\theta$ at the cover layer provided between the surface 30 of the disc and the information storage layer 32 becomes 34.5 degrees. Since the cover layer has a thickness of 0.1 mm, the spot diameter D at the surface 30 of the BD is given by $D = 2 \times 0.1 \times \tan(34.5) = 0.137$ mm.

On the other hand, a DVD has an $NA=0.6$. That is why supposing the refractive index n of the cover layer provided between the surface 30 of the disc and the information storage layer 34 is 1.5, then $0.60 = 1.5 \times \sin \theta$ is satisfied. Thus, the angle of incidence $\theta$ becomes 23.6 degrees. Since the cover layer has a thickness of 0.6 mm, the spot diameter D at the surface 30 of the DVD is given by $D = 2 \times 0.6 \times \tan(23.6) = 0.524$ mm.

Therefore, since the spot diameters D at the surface 30 of the BD and DVD become approximately equal to 0.14 mm and 0.52 mm, respectively, the resolution of the BD becomes approximately four times as high as that of the DVD. The fingerprint dots 20 are made of sebum, for example, and have a height (or thickness) of approximately 100 µm and a refractive index of approximately 1.3 to 1.6. That is why where those fingerprint dots 20 are present at the surface 30 of the disc, the thickness of the cover layer substantially increases by the height of the fingerprint dots 20. As a result, when the incoming light beam passes through the dots 20, a spherical aberration is produced. For example, if the dots 20 are supposed to be detected by an increase or a decrease in the amplitude of an RF signal, a difference in signal level caused between the fingerprint dots 20 and a dot-to-dot gap expands as the spherical aberration varies. As a result, the fingerprint can be detected even more sensitively.

Figure 2:
FIG. 2 A micrograph of an actual fingerprint illustrating a principle of fingerprint detection on a BD.
Figure 3:
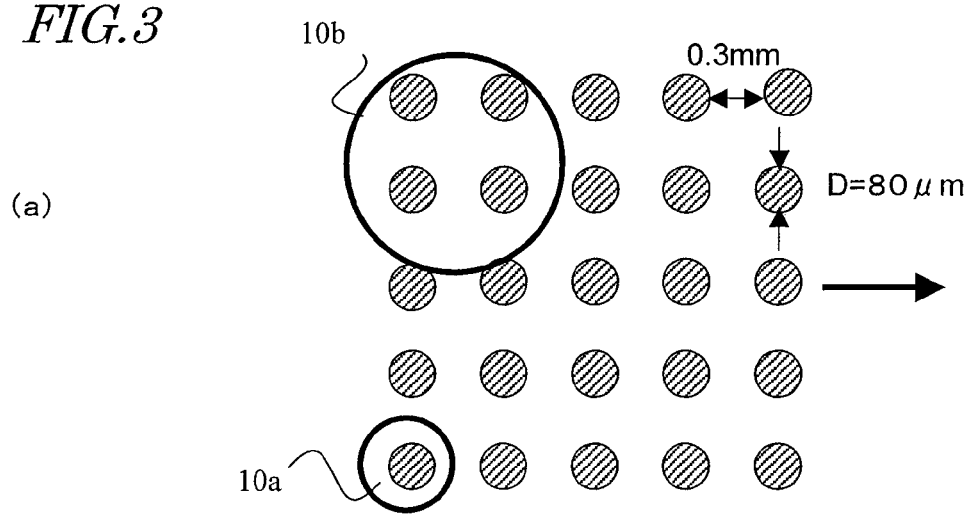
FIG. 3 Portions (a) to (c) of FIG. 3 schematically show the locations of light beam spots with respect to fingerprint dots to illustrate a principle of fingerprint detection on a BD.
Figure 3:
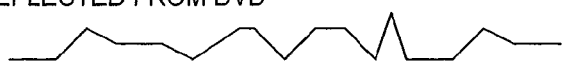
Figure 3:
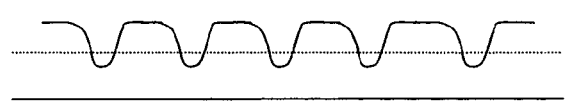

FIG. 2 is a micrograph of a fingerprint, in which the white dots represent fingerprint dots. Specific shape of a fingerprint varies between individuals according to their sex and age. In general, however, each dot 20 of a fingerprint normally has a diameter of approximately 80 µm or less and a dot-to-dot gap has a length of approximately 0.30 mm on average. As a result, the diameter of the spot 10a at the surface of the BD becomes smaller than the length of the dot-to-dot gap as shown in portion (a) of FIG. 3, and therefore, the apparatus can sense the light beam spot pass one fingerprint dot 20 after another by an increase or a decrease in the amplitude of the RF signal as shown in portion (c) of FIG. 3. Conversely, since the diameter of the spot 10b at the surface of the DVD becomes greater than the length of the dot-to-dot gap, the variation in the amplitude of the RF signal rather diminishes as shown in portion (b) of FIG. 3 even if the light beam spot passes one fingerprint dot 20 after another. Thus, it is difficult to detect the fingerprint dots 20 in that case.

Figure 4:
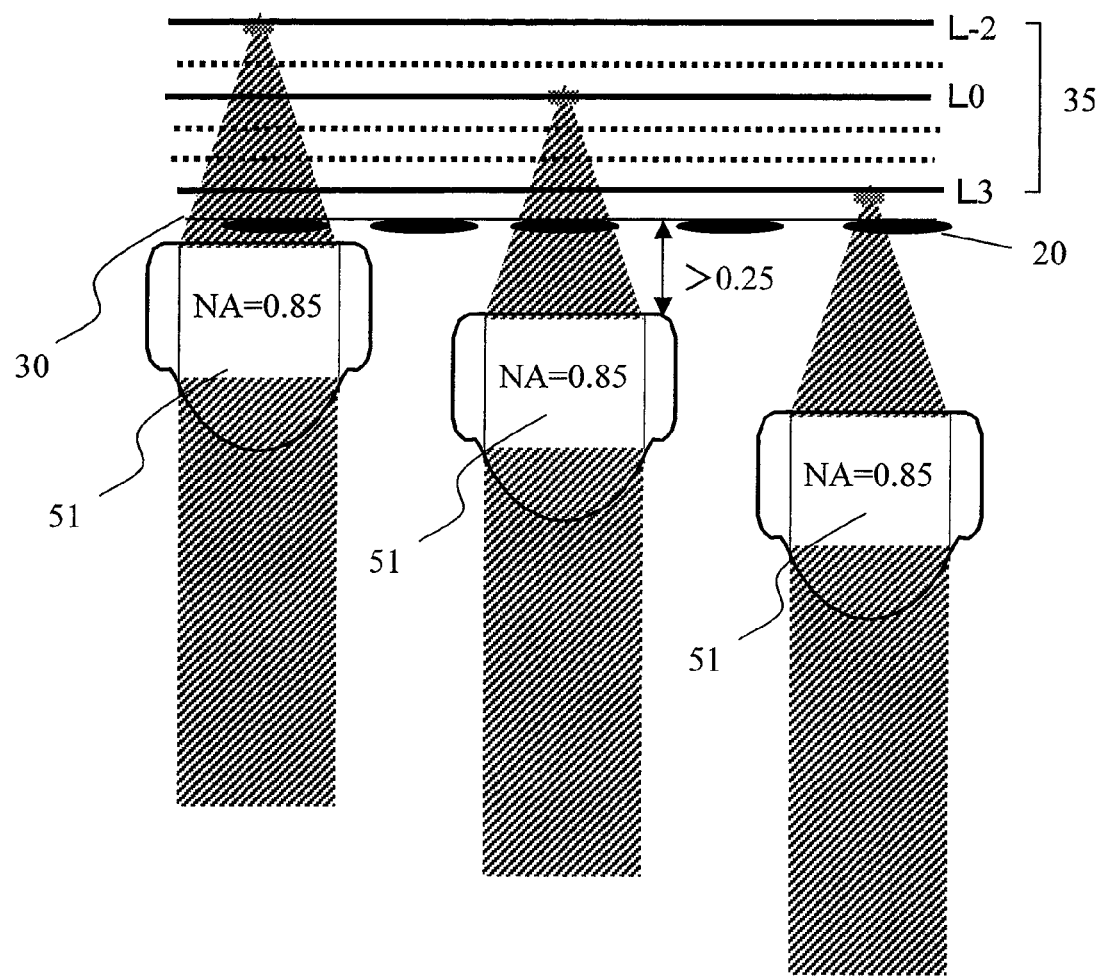
FIG. 4 Schematically illustrates how a light beam may be focused on the shallowest, reference and deepest layers of a six-layer disc.

FIG. 4 schematically illustrates three different situations where the light beam is focused on the shallowest layer that is located closest to the surface of a six-layer disc, its reference layer, and the deepest layer that is located most distant from that surface, respectively. The six-layer disc shown in FIG. 4 has six information storage layers 35 that are called L−2, L−1, L0, L1, L2 and L3 layers, respectively, which are counted from the deepest one under the surface of the optical disc. That is to say, the deepest information storage layer is called "L−2 layer". In this case, the L0 layer is located at the same depth (of 0.1 mm) as the only information storage layer of a single-layer BD. In other words, the L−1 and L−2 layers are located at deeper levels than the only information storage layer of a single-layer BD, while the L1, L2 and L3 layers are located at shallower levels than the only information storage layer of a single-layer BD.

In FIG. 4, illustrated are a situation where the light beam is focused on the shallowest layer L3 that is located closest to the disc surface, a situation where the light beam is focused on the reference layer L0 that is located as deep as the only information storage layer of a single-layer BD, and a situation where the light beam is focused on the deepest layer L−2 that is located most distant from the disc surface.

The following Table 1 summarizes the light-transmitting layer thicknesses of respective information storage layers that are included in a four-layer BD, a six-layer BD and a 16-layer BD in a situation where the layer-to-layer gap is the same everywhere in those three types of discs, and the beam spot sizes (calculated) of a light beam on the disc surface in a situation where the light beam is focused on those information storage layers.

TABLE 1

| | Light-transmitting layer thickness | beam spot size on disc surface |
|---|---|---|
| Four-layer BD | 100 μm | 0.137 mm |
| | 75 μm | 0.103 mm |
| | 50 μm | 0.069 mm |
| | 25 μm | 0.034 mm |
| Six-layer BD | 150 μm | 0.206 mm |
| | 125 μm | 0.172 mm |
| | 100 μm | 0.137 mm |
| | 75 μm | 0.103 mm |
| | 50 μm | 0.069 mm |
| | 25 μm | 0.034 mm |
| Sixteen-layer BD | 100 μm | 0.137 mm |
| | 95 μm | 0.130 mm |
| | 90 μm | 0.124 mm |
| | 85 μm | 0.117 mm |
| | 80 μm | 0.110 mm |
| | 75 μm | 0.103 mm |
| | 70 μm | 0.096 mm |
| | 65 μm | 0.089 mm |
| | 60 μm | 0.082 mm |
| | 55 μm | 0.076 mm |
| | 50 μm | 0.069 mm |
| | 45 μm | 0.062 mm |
| | 40 μm | 0.055 mm |
| | 35 μm | 0.048 mm |
| | 30 μm | 0.041 mm |
| | 25 μm | 0.034 mm |

As the number of information storage layers stacked in a BD increases in this manner and if any of the information storage layers on which the light beam needs to be focused comes to have a smaller light-transmitting layer thickness (i.e., the depth of the information storage layer) than that of a single-layer BD (that is 0.1 mm), the beam spot size at the disc surface shrinks. As a result, due to the presence of a fingerprint, the optical power of the light beam would be lost more significantly when a write operation is performed and a bigger part of the read signal would be missing when a read operation is performed. Consequently, the actual read/write operation cannot be carried out with good stability and quality. Conversely, a beam spot size smaller than that of a light beam to scan a single-layer BD (which may have a spot size of 100 μm) or that of a light beam to scan a dual-layer BD (which may have a spot size of 75 μm) is small enough to detect the fingerprint dots 20 shown in FIG. 1 and can contribute to getting the fingerprint detected accurately. However, if the light-transmitting layer thickness becomes greater than that of a single-layer BD (which may be 0.1 mm), the beam spot size at the disc surface increases too much to be sensitive enough to the fingerprint dots 20. As a result, the fingerprint cannot be detected accurately in that case.

Even a multilayer storage medium with three, four, six, sixteen or eighteen information storage layers is preferably designed such that the focus control gets locked and the fingerprint is detected when the light beam is focused on the reference layer that has a depth of 0.1 mm under the disc surface. This is because the property of the light beam would be equivalent there, no matter how many information storage layers are stacked in the optical disc loaded. Then there will be no need to change the sequence of the disc loading process compared to that of conventional single- or dual-layer disc. The disc loading process should be performed after the fingerprint detection process to be described later and then a predetermined type of recovery process such as cleaning or fingerprint defect registration get done. That is why even if standards for optical discs with even greater numbers of information storage layers such as four-, six-, . . . sixteen- and twenty-layer discs are released one after another as a result of future researches and developments, it should still be easy to cope with such standards. That is to say, as long as the optical pickup is designed so as to be able to read/write data from/on such a multilayer BD, any BD recorder and any PC drive will maintain compatibility with multilayer BD discs compliant with various BD formats, which will go on sale one after another in the near future, by getting their firmware updated by on-air loading as for BD recorders or by downloading from a website as for PC drives.

In performing a multilayer disc type recognition, there is no need to sense exactly how many information storage layers the multilayer BD loaded has. Instead, in a preferred embodiment of the present invention, the multilayer disc type recognition is carried out by determining whether the optical disc loaded is a conventional single- or dual-layer BD or a multilayer BD with three or more information storage layers. Naturally, however, it is also possible to actually detect the number of information storage layers that the optical disc loaded has.

The multilayer disc type recognition may also get done by counting the number of S-curves or detecting the output AS signal that will appear every time the light beam spot passes through one of those information storage layers when the objective lens is brought toward, or away from, the optical disc loaded. Such a multilayer disc type recognition method is disclosed in Japanese Patent Application Laid-Open Publication No. 2007-265596, for example. In the preferred embodiment described above, the fingerprint is supposed to be detected with the light beam focused on the reference information storage layer (at a depth of 0.1 mm) that is included in all of single-layer, dual-layer, and multilayer optical discs with the future compatibility issue taken into account. If the light beam is focused on an information storage layer that is located at a depth of less than 0.1 mm under the disc surface, the light beam spot at the disc surface will have an even smaller size. That is why the fingerprint can also be detected sufficiently accurately even if the light beam is focused on such an information storage layer that is located at a depth of less than 0.1 mm under the disc surface. For that reason, after the multilayer disc type recognition gets done, the fingerprint may be detected with the focus adjusted on such an information storage layer with a light-transmitting layer thickness of less than 0.1 mm. That is to say, the fingerprint detection and cleaning may be carried out with the light beam focused on the information storage layer at a depth of 0.1 mm as for a conventional single- or dual-layer BD and with the light beam focused on the shallowest information storage layer, closest to the disc surface, as for a multilayer BD. If the focus is adjusted on such an information storage layer that is located closest to the disc surface, the beam spot size at the disc surface can be the smallest, which will work fine in getting the fingerprint detected.

In reading or writing data from/on such a shallowest information storage layer that is located closest to the surface of a multilayer disc, the read/write operation will be affected more significantly by a fingerprint compared to a situation where a conventional single- or dual-layer BD is used. That is why to get the read/write operation done with stability, some measure must be taken to minimize the influence of fingerprints.

Meanwhile, an information storage layer that is arranged at a deep level under the disc surface would be affected too significantly by coma aberration due to tilting to ensure a predetermined storage density. A current single-layer BD has a working distance WD (i.e., the distance between the convergent lens and the disc) of around 0.3 mm if the NA is 0.85 and if the wavelength $\lambda$ is 405 nm. However, if a few information storage layers were stacked at such deep levels under the disc surface, the working distance WD would have very little margin when the light beam should be focused on any of those deep information storage layers. Even in an optical disc with as many as 16 or 20 information storage layers, it is not preferred that those information storage layers be arranged at such deep levels. That is to say, even in that case, all of those many information storage layers are preferably arranged relatively close to the surface of the optical disc. More specifically, considering various restrictions that could be imposed on the design process, those information storage layers are preferably stacked so that each and every layer is located within a depth of 0.2 mm under the disc surface. If an information storage layer were arranged deeper than the only information storage layer of a single-layer BD (that is located at 0.1 mm), then such a layer would have an insufficient tilt margin. That is why if the number of information storage layers to stack becomes equal to or greater than sixteen, a greater number of information storage layers will be located close to the disc surface and will be affected by a fingerprint more easily. Consequently, to ensure a huge storage capacity for a multilayer BD with stability, it is effective to detect a fingerprint and wipe it away from an optical disc with three or more information storage layers, among other things.

In a preferred embodiment of the present invention, when the apparatus is started (i.e., when the apparatus is being powered or loaded with an optical disc. Such a process will be referred to herein as a "startup process"), it is determined whether the optical disc loaded is a conventional single- or dual-layer BD or a lately developed multilayer BD with three, four, six, sixteen or even twenty information storage layers. And if the apparatus is now loaded with a multilayer BD with three or more information storage layers, fingerprint detection is started before the startup process is completed. This is because if fingerprint detection were started after it has taken a long time to get the startup process done and if any fingerprint were detected as a result, then cleaning should be done first, and then that long startup process should be done all over again. However, if the fingerprint detection is started before the startup process is finished, then there will be no need to perform the extra start process all over again on an optical disc with a fingerprint.

For example, as for a dual-layer BD, currently it takes 20 seconds to get the startup process done. That is why if all servo and laser parameters of every information storage layer of a 16-layer BD must be learned, then it will take 60 seconds or more to get the startup process done. That is to say, if such a 16-layer BD should be supported by simply extending a conventional optical disc apparatus, then the fingerprint detection could not be started until 60 seconds has passed since the optical disc apparatus was turned ON. And if any fingerprint were actually detected, then cleaning should be done after that to wipe the fingerprint away. However, if the defect turned out to be a non-removable and irreplaceable fatal permanent defect such as a bubble or a scratch, instead of just a fingerprint, then the user would have to wait a long time only to read a frustrating alert that says "this disc is unusable". Also, if the user has to leave the place after he or she has entered a recording schedule in a hurry, for example, then the result of the fingerprint detection could be displayed after he or she has gone. In that case, the TV program on the recording schedule could fail to be recorded.

In a preferred embodiment of the present invention, the optical disc can also be cleaned quickly. Also, in another preferred embodiment of the present invention, a number of recycled BDs can be cleaned at a time so as to get ready for use anytime. That is to say, according to the present invention, a convenient function called "cleaning mode" may be added.

Furthermore, in a preferred embodiment of the present invention, when the apparatus is started, first it is determined whether the BD loaded is a multilayer BD or not. If the answer is YES, fingerprint detection is carried out. And an appropriate type of processing is performed according to the result of the fingerprint detection.

Embodiment 1

Figure 5:
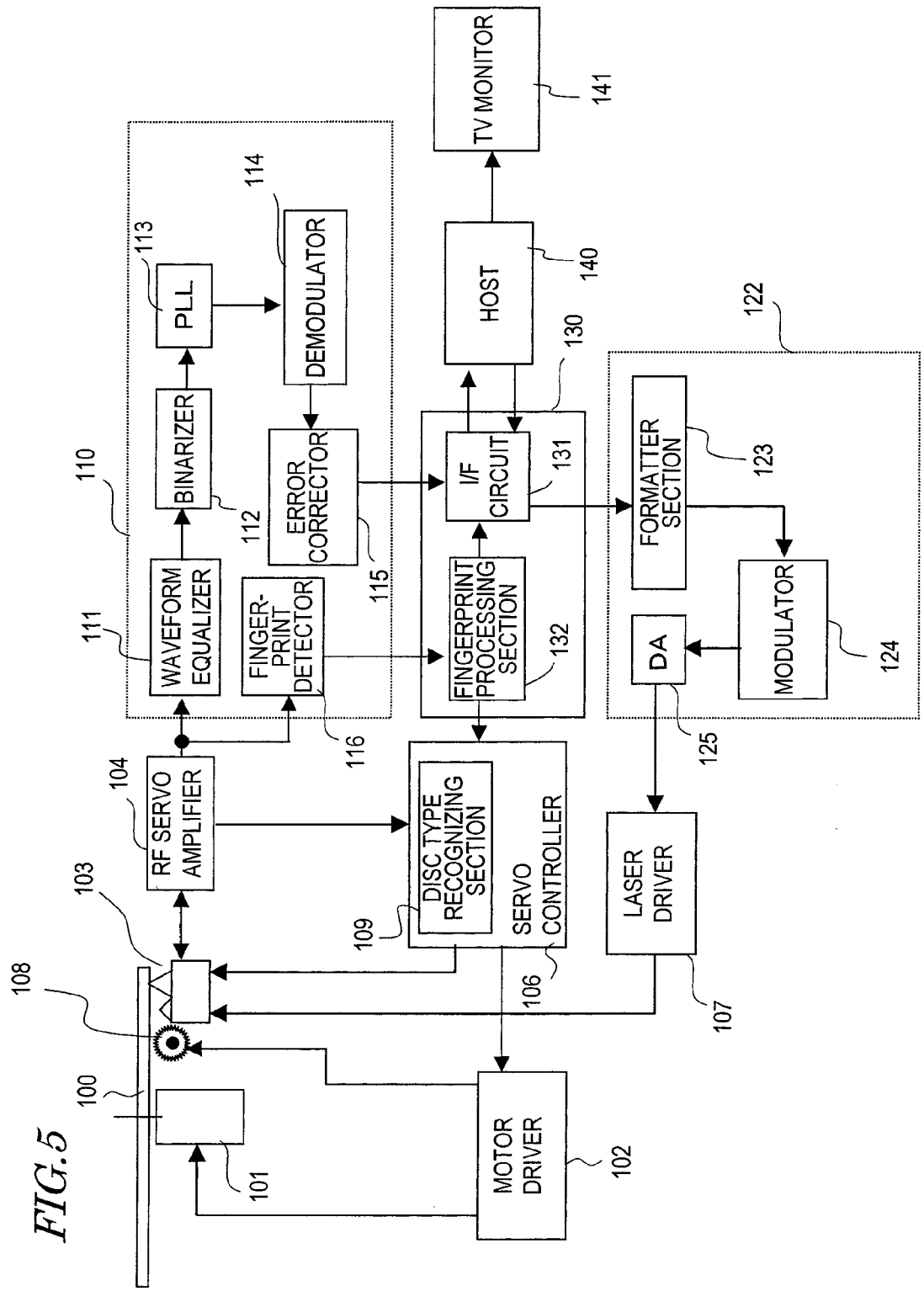
FIG. 5 Illustrates the arrangement of functional blocks in an optical disc apparatus as a first preferred embodiment of the present invention.
Figure 6:
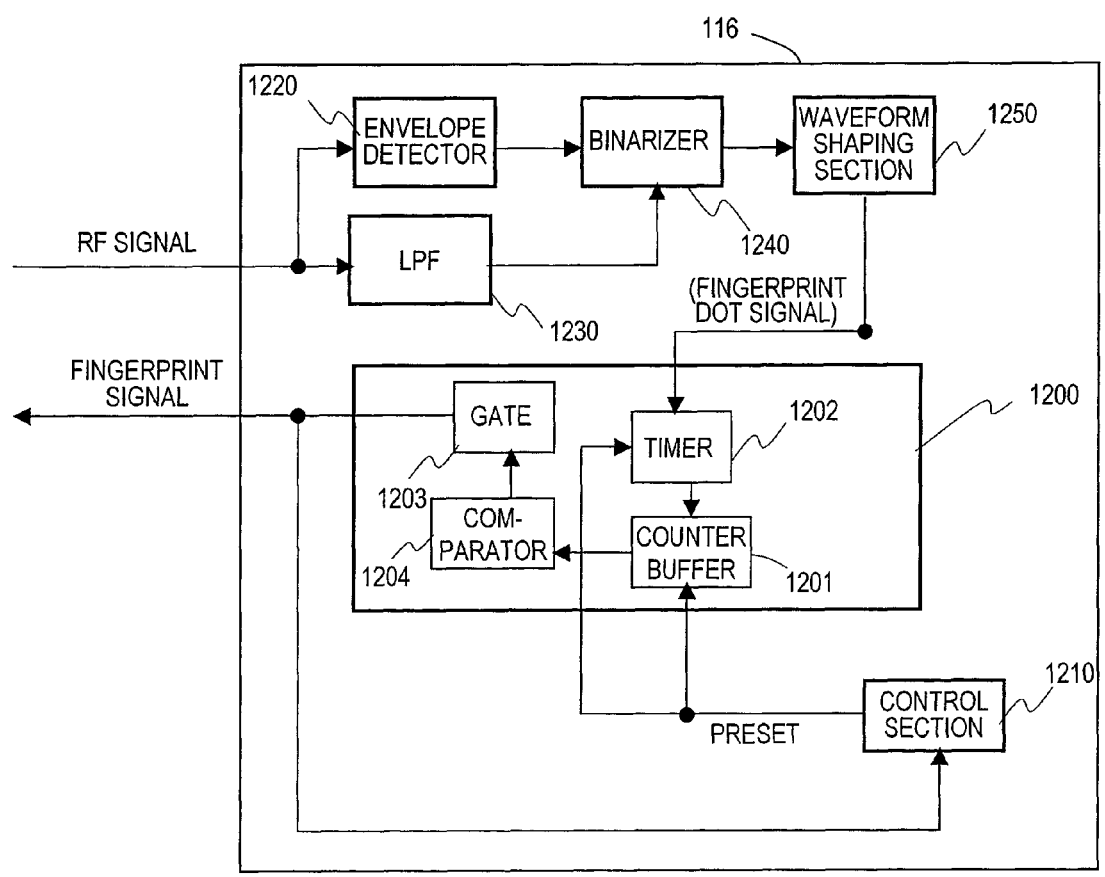
FIG. 6 A block diagram illustrating the detailed configuration of the fingerprint detector shown in FIG. 5.

Hereinafter, a First Specific Preferred Embodiment of an optical disc apparatus according to the present invention, including a fingerprint detector, will be described with reference to FIGS. 5 and 6. FIG. 5 is a block diagram illustrating a configuration for an optical disc apparatus as a preferred embodiment of the present invention. FIG. 6 shows the arrangement of functional blocks in the fingerprint detector of this preferred embodiment.

First of all, the basic configuration of an optical disc apparatus according to the present invention will be described with reference to FIG. 5.

The optical disc apparatus shown in FIG. 5 includes an optical pickup 103, which includes an optical system for converging a light beam on an optical disc, a photodetector for detecting the light reflected from the optical disc, and a laser diode (not shown) as a light source. The apparatus further includes a servo controller 106 for controlling the operation of the optical pickup 103, a read circuit 110 for performing read signal processing on an information signal that has been detected from the optical disc 100 by the optical pickup 103, and a write circuit 122 for writing information to store on the optical disc 100 by activating the laser diode by a predetermined modulating technique and making the laser diode generate a pulsed laser beam representing the information to be written and stored.

Specifically, the optical pickup 103 irradiates the optical disc 100, which has been mounted on an optical disc motor 101, with a converged laser beam. An RF servo amplifier 104 generates an electrical signal based on the light that has been reflected from the optical disc 100. The servo controller 106 performs a focus control and a tracking control on the optical disc 100 that has been mounted on the optical disc motor 101. The servo controller 106 includes a disc type recognizing section 109 for determining, by irradiating the optical disc 100 with a light beam using a light source and a lens, whether the optical disc loaded 100 is a single- or dual-layer disc or a disc with more than two information storage layers.

In the read circuit 110, a waveform equalizer 111 equalizes the electrical signal supplied from the RF servo amplifier 104, thereby generating an analog read signal, which is then binarized by a binarizer 112. The binary signal thus obtained is synchronized with a read clock signal (functioning as a reference clock signal) by a PLL circuit 113, thereby extracting data. Thereafter, a demodulator 114 and an error corrector 115 make an error correction on every predetermined number of blocks of that data. Then, the signal thus obtained is output from the read circuit 110 to a system controller 130, which includes an I/F circuit 131 and a fingerprint processing section 132. The signal that has been entered into the system controller 130 from the read circuit 110 is also transferred to a host 140 by way of the I/F circuit 131.

The write circuit 122 includes a formatter section 123 that adds a header and redundancy bits for the purpose of error correction, a modulator 124 for modulating the signal into a predetermined modulation pattern (or by a predetermined modulating method), and a D/A converter 125 for converting the digital signal into an analog signal to be input to a laser driver 107.

To write the information that has been provided from the host 140 by way of the I/F circuit 131 on the optical disc 100, the write circuit 122 activates the laser diode (not shown) in the optical pickup 103 and makes it produce a pulsed laser beam. As the laser beam impinging on the optical disc 100 varies its intensities, the reflectances of the recording material (such as an organic material or a phase change material) of the optical disc 100 are changed, thereby writing information as ones or zeros.

When the light beam passes through a fingerprint on the optical disc 100, the amplitude of the output signal of the RF servo amplifier 104 changes significantly depending on whether the light beam is passing through the fingerprint dots themselves or the gap between those dots. The fingerprint detector 116 monitors that change of the amplitudes, thereby determining whether or not there is a fingerprint on the optical disc 100. A fingerprint signal thus generated by the fingerprint detector 116 is input to the fingerprint processing section 132 in the system controller 130.

Look at FIG. 6 next. The RF signal supplied from the RF servo amplifier 104 shown in FIG. 5 is input to an LPF 1230 and an envelope detector 1220 in the fingerprint detector 116 shown in FIG. 6. The outputs of the envelope detector 1220 and the LPF 1230 are both entered into a binarizer 1240, which slices off the output signal of the envelope detector 1220 with the level of the output signal of the LPF 1230 defined as a reference level for binarization (i.e., as a slice level). As a result, a binarized signal that makes transitions between High level (of a pulse) representing fingerprint dots and Low level representing the dot-to-dot gap (which will be referred to herein as a "fingerprint dot signal") is generated.

The fingerprint dot signal has its waveform shaped by a waveform shaping section 1250 and then is input to a fingerprint measuring section 1200. The fingerprint dot signal has a pulse train representing the respective dots that form the fingerprint. That is why by measuring the pulse widths and pulse intervals, the fingerprint can be distinguished from the other types of defects. In the fingerprint measuring section 1200, a timer 1202 measures the widths of the respective pulses (at High level) included in the fingerprint dot signal and the intervals (at Low level) between those pulses. If the measured values fall within the range of predetermined pulse widths representing fingerprint dots and within the range of predetermined intervals representing dot-to-dot gaps, the number of the fingerprint dots is stored in a counter buffer 1201. If the light beam is going to pass through a number of fingerprint dots, the number of dots is incremented by one every time the light beam passes through one of the fingerprint dots. That is why if the defect that the light beam is now passing is a fingerprint, at least a predetermined number of dots are detected continuously. The count (i.e., the output signal) of the counter buffer 1201 is compared to a predetermined value by a comparator 1204. If the count of the counter buffer 1201 is equal to or greater than the predetermined value, a gate circuit 1203 is notified of the result of the comparison made by the comparator 1204. Based on the output of the comparator 1204, the gate circuit 1203 generates a signal indicating whether the defect detected is a fingerprint or not (which will be referred to herein as a "fingerprint signal"). Then, the fingerprint signal is fed back from the gate circuit 1203 to a control section 1210. In response to this feedback, the timer 1202 and the counter buffer 1201 are preset. Also, while getting ready to enter the next fingerprint detecting state, the fingerprint detector 116 outputs the fingerprint signal to the fingerprint processing section 132 in the system controller 130 shown in FIG. 5.

A steep drop of the amplitude of an RF signal due to presence of dust or a scratch is called "black dropout (BDO)". Thus, defects caused by dust or a scratch (i.e., defects other than fingerprints) will sometimes be referred to herein as "BDO", too. If the light beam passes an area that would produce a BDO (which will be referred to herein as a "BDO area"), then the binarizer 1240 outputs only a single-pulse signal with a long pulse width. As a result, the gate is kept "L" due to the restriction on the width represented by a timer value and on the count of the counter buffer. Since the control section 1210 presets the timer 1202 and the counter buffer 1201 in such a state, no fingerprint signal is output if the light beam has passed the BDO area.

Next, it will be described with reference to FIGS. 7 and 8 how signal waveforms change due to a defect.

Figure 7:
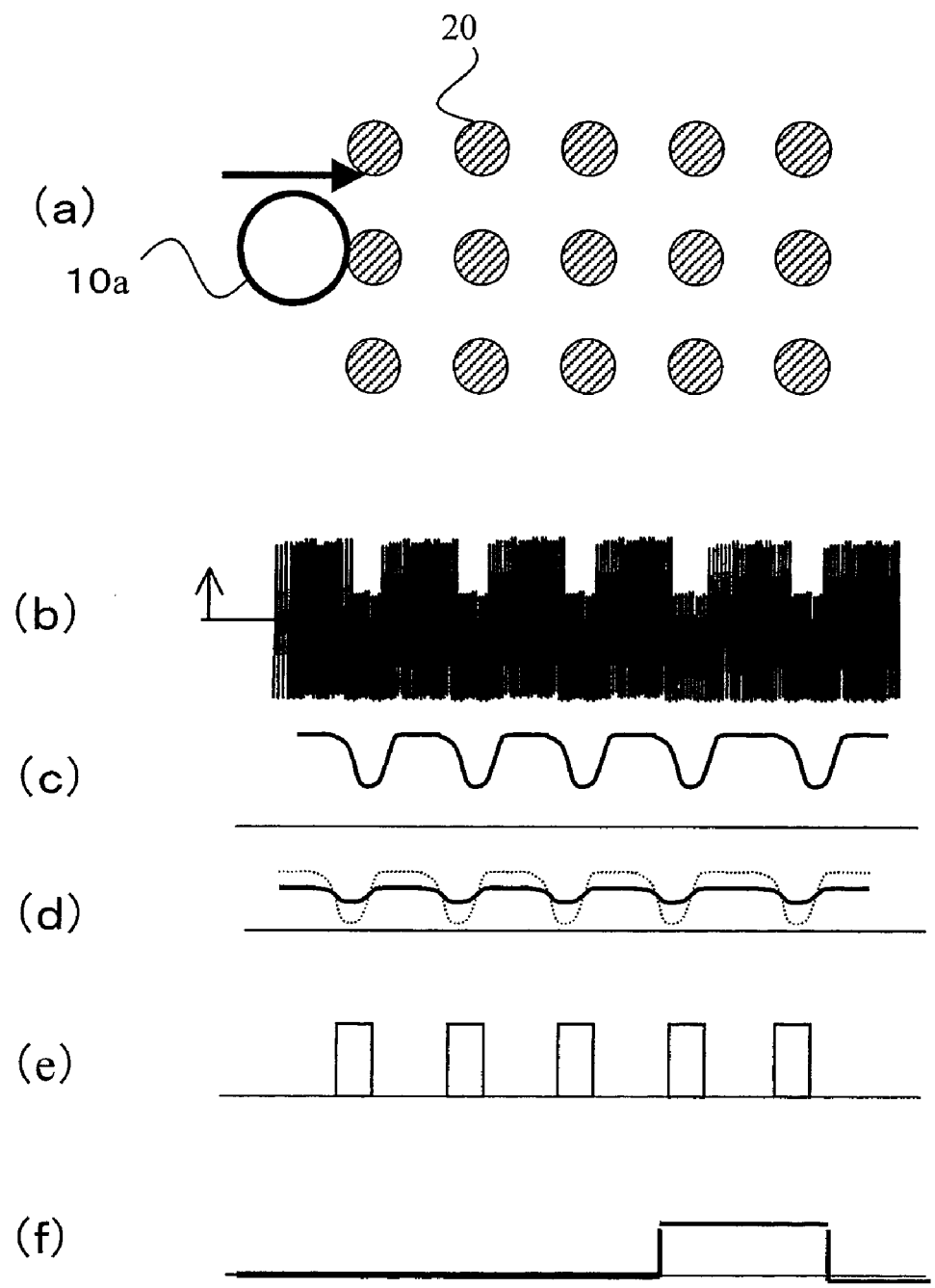
FIG. 7 Portion (a) of FIG. 7 is a plan view schematically illustrating the location of a light beam spot with respect to fingerprint dots and portions (b) through (f) of FIG. 7 show the waveforms of respective signals to illustrate how the detector shown in FIG. 5 detects a fingerprint.
Figure 8:
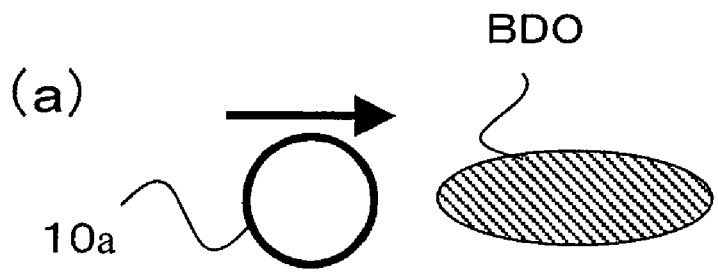
FIG. 8 Portion (a) of FIG. 8 is a plan view schematically illustrating the location of a light beam spot with respect to a BDO area and portions (b) through (f) of FIG. 8 show the waveforms of respective signals to illustrate how the detector shown in FIG. 5 detects a fingerprint.
Figure 8:
Figure 8:
Figure 8:
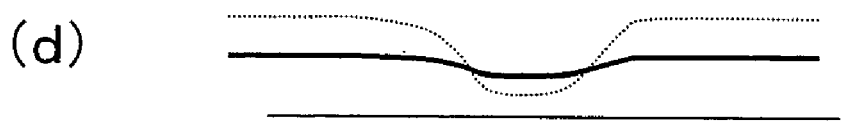
Figure 8:
Figure 8:

FIGS. 7 and 8 are timing diagrams showing how the signals of respective components of the fingerprint detector change their waveforms in a situation where a light beam to read and write from/to a BD passes a fingerprint and a BDO area. More specifically, portion (a) of FIG. 7 is a plan view schematically illustrating a light beam spot 10*a* and fingerprint dots 20. Portion (b) of FIG. 7 shows the waveform of the output of the RF servo amplifier 104 (i.e., an RF signal) when the light beam spot 10*a* passes the fingerprint dots 20. Portion (c) of FIG. 7 shows the output of the envelope detector 1220. Portion (d) of FIG. 7 shows the output of the LPF 1230. Portion (e) of FIG. 7 shows the waveform of the signal that has been binarized and has its waveform shaped by the binarizer 1240 (i.e., the fingerprint dot signal). And portion (f) of FIG. 7 shows the waveform of the fingerprint signal that is the output of the gate circuit 1203.

On the other hand, portion (a) of FIG. 8 is a plan view schematically illustrating a light beam spot 10*a* and a BDO area. Portion (b) of FIG. 8 shows the waveform of the output of the RF servo amplifier 104 (i.e., an RF signal) when the light beam spot 10*a* passes the BDO area. Portion (c) of FIG. 8 shows the output of the envelope detector 1220. Portion (d) of FIG. 8 shows the output of the LPF 1230. Portion (e) of FIG. 8 shows the waveform of the signal that has been binarized and has its waveform shaped by the binarizer 1240 (i.e., the fingerprint dot signal). And portion (f) of FIG. 8 shows the waveform of the fingerprint signal that is the output of the gate circuit 1203.

As described above, the diameter of the light beam spot 10*a* on a BD is approximately one fifth to a quarter as large as that of the light beam spot 10*b* on a DVD, and is close to the sizes of the fingerprint dots 20 or the dot-to-dot gap. That is why when the light beam spot 10*a* passes a fingerprint, the amplitude of the RF signal representing the reflected light varies as shown in portion (b) of FIG. 7. The amplitude of the RF signal decreases because the intensity of the reflected light decreases when the light beam spot 10*a* passes each of the fingerprint dots that form the fingerprint. On the other hand, if the light beam spot 10*b* has a large diameter as in a DVD (see FIG. 3), multiple fingerprint dots are always included in the single light beam spot 10*b*. That is why the decrease in the amplitude of the RF signal in response to the passage of the light beam spot through each fingerprint dot as shown in portion (b) of FIG. 7 cannot be detected from a DVD.

Portion (d) of FIG. 7 shows how the signal shown in portion (b) of FIG. 7 changes its waveforms when output from the LPF 1230. If the output of the envelope detector 1220 shown in portion (c) of FIG. 7 is binarized by comparing its levels to the reference detection level that is defined by this LPF output, a fingerprint dot signal having a waveform representing the fingerprint dots can be obtained as shown in portion (e) of FIG. 7. If the timer 1202 has found the fingerprint dot signal have a predetermined pulse width (which will be referred to herein as "H width") and a predetermined pulse interval (which will be referred to herein as "L width"), then the fingerprint dot signal is stored in the counter buffer 1201. If the comparator 1204 has found the pulse widths of the fingerprint dot signal equal to or greater than a predetermined value a prescribed number of times (e.g., three times) consecutively, then the gate circuit 1203 generates and outputs a fingerprint signal as shown in portion (f) of FIG. 7. Also, if the timer 1202 has found the interval between the pulses of the fingerprint dot signal (i.e., the "L width") greater than t3, then the fingerprint signal is changed from H level into L level.

On the other hand, since a BDO area is bigger than a fingerprint dot, the amplitude of the RF signal continues to drop for a relatively long time as shown in portion (b) of FIG. 8. When such an RF signal is passed through the LPF 1230, the LPF output shown in portion (d) of FIG. 8 is obtained.

If the output of the envelope detector shown in portion (c) of FIG. 8 is binarized by the binarizer 1240, then a fingerprint dot signal, having a waveform representing the magnitude of the BDO, can be obtained as shown in portion (e) of FIG. 8. The pulse width (i.e., "H width") of this fingerprint dot signal is measured by the timer 1202. In this case, since the pulse width fails to satisfy t1<H width<t2, the count of the counter buffer 1201 is not incremented. As a result, no fingerprint signal is output in this case as shown in portion (f) of FIG. 8.

The fingerprint can also be detected in the same way no matter whether the disc to scan is a single-layer BD or a multilayer BD. Also, as already described with reference to Table 1, if the optical disc loaded has turned out to be a multilayer disc and if the fingerprint is detected with the light beam focused on a layer that is located shallower than 0.1 mm, then the light beam spot will have a smaller size at the disc surface. That is why the pulse width of the fingerprint signal could be increased to a sufficient one by finely adjusting the frequency characteristic of the LPF 1230 or the slice level of the binarizer 1240 with an offset voltage added to the output of the LPF 1230 when it is appropriate.

Hereinafter, it will be described how to carry out the multilayer disc recognition. The optical disc loaded can be determined to be either a single- or dual-layer BD or any of the other types basically by the method disclosed in Japanese Patent Application Laid-Open Publication No. 2007-265596 cited above.

As described above, any optical disc has at least one information storage layer on which information is stored and a light-transmitting layer that is arranged either on that information storage layer or between the information storage layers. Optical discs are classified into various types according to the thickness of the light-transmitting layer and the physical property of the information storage layer. In other words, the type of the optical disc loaded can be recognized by detecting the thickness of the light-transmitting layer, the physical property of the information storage layer, and/or the number of information storage layers included.

Figure 9:
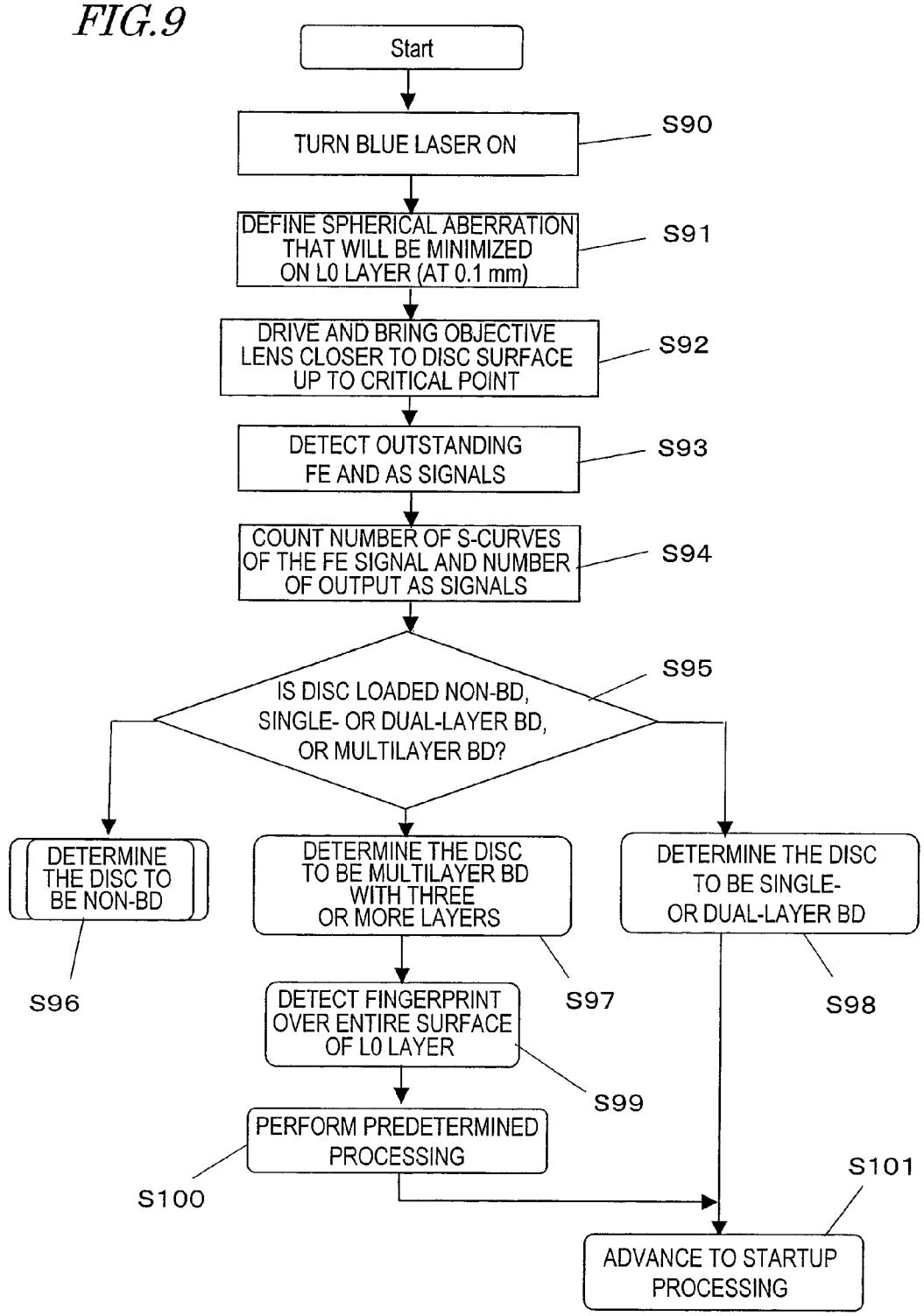
FIG. 9 A flowchart showing the procedure of the disc type recognition process.

FIG. 9 is a flowchart showing the procedure of a disc type recognition process that can be carried out in a preferred embodiment of the present invention. Hereinafter, this flow will be described in detail.

First of all, in Step S90, the motor driver 102 rotates the disc motor 101 at a predetermined rotational frequency, while the laser driver 107 outputs a control signal to make a blue-ray-emitting semiconductor laser (not shown) in the optical pickup 103 emits a laser beam.

Next, in Step S91, an aberration correction condition is defined so that the spherical aberration is minimized on the L0 layer (with a light-transmitting layer thickness of 0.1 mm).

Subsequently, in Step S92, to determine the thickness of the light-transmitting layer, the servo controller 106 outputs a control signal to the optical pickup 103, thereby moving the objective lens (not shown) in the optical pickup 106 toward the optical disc 100 at a predetermined velocity in the optical axis direction.

Thereafter, in Steps S93 and S94, it is determined what detection signals (such as FE and AS) represent an outstanding peak of the intensity of reflected light that is produced at some depth under the surface of the optical disc where the light beam is focused. Specifically, by bringing the objective lens closer to the optical disc, detection signals, representing such an outstanding peak of the intensity of the reflected light that is produced at a point where the light beam is focused on a first information storage layer, are detected and the thickness of the light-transmitting layer is calculated based on the amount of time it has taken for the objective lens to reach that position. Then, with the objective lens brought even closer to the optical disc, the number of S-curves and the number of output AS signals are counted.

Next, in Step S95, the disc type recognizing section 109 determines, by the number of S-curves of the FE signal, the number of output AS signals, the thickness of the light-transmitting layer and other data that have been obtained in the previous processing steps S93 and S94, whether the optical disc currently loaded in the optical disc apparatus is a BD or not. If the answer is YES, the disc type recognizing section 109 also determines whether the BD is a single- or dual-layer one or any other type. For example, if two information storage layers have been detected, the disc type recognizing section 109 determines the optical disc loaded to be a dual-layer disc (in Step S98). And if three information storage layers have been detected when the objective lens is brought even closer to the disc, then the disc type recognizing section 109 determines the optical disc loaded to be three-layer disc (in Step S97).

In this manner, the type of the optical disc loaded can be recognized based on the number of information storage layers that has been eventually detected when the objective lens is brought as close to the optical disc as possible (i.e., to the designed critical point). However, if no information storage layers can be detected at all even when the objective lens reaches that critical point, then the optical disc loaded can be determined to be a DVD or a CD in Step S96.

If the optical disc loaded has been determined to be a multilayer disc with three or more information storage layers, then the process advances to Step S99, in which the fingerprint detecting section 116 searches the entire surface of the L0 layer for any fingerprints. If it has been determined that there is a fingerprint on the optical disc, a predetermined type of processing such as the output of an alert message or automatic cleaning (to be described later for the first through fifth preferred embodiments of the present invention) is performed in Step S100 and then the process advances to a startup processing step S101.

In this example, the fingerprint detection is carried out if the optical disc loaded is a multilayer disc with three or more information storage layers. However, the present invention is in no way limited to this specific example. Optionally, the fingerprint detection may be omitted if the number of information storage layers included in the optical disc loaded is five or less but may be performed only if the optical disc loaded has six or more information storage layers. As for a BD, however, the signal has little read/write margin even at the L1 layer with a depth of 75 μm. That is why to ensure as high fingerprint detection ability as with respect to a dual-layer BD, it is preferred that the fingerprint detection be started as soon as the optical disc loaded turns out to be a multilayer BD with three or more information storage layers.

However, the present invention is not limited to such a multilayer disc type recognition method but may also be carried out using a different disc type recognition method as well.

Specifically, if the optical disc currently loaded in the optical disc apparatus has turned out to be any type of BD (which may be a single-layer BD, a dual-layer BD, or a multilayer BD) in Step S97 or S98, then a focus control may be carried out so that the light beam is focused on the reference layer that is located at a depth of 0.1 mm. More specifically, if the optical disc loaded has been determined to be a conventional single- or dual-layer disc by the multilayer disc type recognition method described above (in Step S98), then the READY state can be established by following the conventional startup procedure. On the other hand, if the optical disc loaded has been determined to be a multilayer BD with three or more information storage layers in Step S97, then the fingerprint detection may be started quickly on the reference layer.

To get the startup process done, it will take approximately 15 seconds as for a single-layer BD and approximately 20 seconds as for a dual-layer BD. The startup process time is not simply proportional to the number of information storage layers included in an optical disc loaded. Specifically, the startup process time includes the amount of time it takes for the spindle motor to reach the predetermined rotational frequency, the amount of time it takes to find a focus on the reference layer (i.e., the L0 layer), the amount of time it takes to shift the focus from the reference layer to another information storage layer by focus jump, and the amount of time it takes to make servo adjustments, including learning spherical aberrations and focus control positions to smooth out non-uniformity in the depth of each information storage layer, on that information storage layer. That is why as for a six-layer BD with L0 through L5 layers, if servo parameters for all information storage layers should be learned, it would take 40 seconds or more to get the startup process done. And it would take as long as 60 seconds or more to get the startup process done on an eight-layer BD. On the other hand, the fingerprint detection can get done with the tracking suspended approximately every 10 μm because fingerprint dots usually have a size of about 80 μm. Thus, the fingerprint detection can be done in approximately 1.5 minutes (=46 minutes/(10 μm÷0.32 μm) at a BD 2× rate (which is approximately 72 Mbps). Meanwhile, if the BD is turned at 4× rate, then it will take approximately 40 seconds to get the fingerprint detection done.

As for a six-layer BD, if the fingerprint detection were carried out after the startup process is finished (in 40 seconds after the apparatus was turned ON), then the fingerprint detection process time would be simply added to the startup process time. That is to say, if the fingerprint detection function were just added to a conventional optical disc apparatus, then the fingerprint detection process could not be started until the startup learning process is quite finished by performing normal servo and signal learning on every information storage layer. Therefore, it would not be until the startup process and the fingerprint detection process are over that the apparatus gets READY (i.e., ready to start a read/write operation) by accessing a track with address 0. That is why it would take a while before an apparatus with no fingerprint wiping mechanism posts an alert saying "a fingerprint has been detected" and prompting the user to check or replace the disc. Likewise, even an apparatus with a fingerprint wiping mechanism would also post an alert saying "this disc is unusable" after having the user wait a long time if the defect detected turned to be a non-removable and irreplaceable fatal permanent defect such as a bubble or a scratch, instead of just a fingerprint. In that case, if the user has to leave the place after he or she has entered a recording schedule in a hurry, for example, then the result of the fingerprint detection could be displayed after he or she has gone. Consequently, the TV program on the recording schedule could fail to be recorded.

According to a preferred embodiment of the present invention, however, the disc type recognition process is carried out before the startup learning process. And if the optical disc loaded has turned out to be a multilayer disc with three or more information storage layers as a result of the disc type recognition process, then the fingerprint detection process will be started as soon as the light beam is focused on the L0 layer. That is why if the apparatus has no fingerprint wiping mechanism, then the time it would take to get a focus search done to recognize the type of the optical disc loaded (approximately one second) and the time it would take to find the focus on the target layer (approximately one second) will be added to the time it would take to detect a fingerprint (approximately 1.5 minutes). Consequently, the alert could be posted within roughly two minutes. Also, in a preferred embodiment of the present invention, if the optical disc loaded has turned out to have less than three information storage layers as a result of the disc type recognition process, then no fingerprint detection process will be carried out. In that case, if the optical disc apparatus is currently loaded with an optical disc with only one information storage layer or two, then the startup learning process can be started immediately while taking no time to get the fingerprint detection process done.

Also, even if the apparatus has some fingerprint wiping mechanism (such as the fingerprint wiping brush 108), the fingerprint can be detected in a shorter time. As a result, the total time to get those various sorts of preprocessing done before a read/write operation is started (which will be referred to herein as "read/write preprocessing") can be shortened. In a preferred embodiment of the present invention, on either the screen of a display device to which the optical disc apparatus is connected or an LED or LCD built in the front panel of the optical disc apparatus, a message such as "fingerprint is now being wiped" could be posted. In that case, the user can confirm the message by taking a little more time before leaving home. Consequently, no programs on the recording schedule should fail to be recorded while the user is away from home, and he or she would be much less frustrated.

Optionally, an apparatus with a fingerprint wiping mechanism can also have a convenient additional function called "cleaning mode" that allows the user to clean a number of used BDs at a time. In general, users will use a brand new BD to record regular TV programs such as soap operas or cartoons on a weekly basis, edit or rearrange those contents stored on the BD by erasing, moving or copying them, and then reuse the same BD to record special long TV programs, which are often broadcast at the end or beginning of the year here in Japan. In that case, since the BD is already not brand new but used, the user should probably have left his or her fingerprints on it. To overcome such a problem, the optical disc apparatus may have the "cleaning mode" function so as to perform fingerprint detection on every disc loaded, including not just multilayer discs but also single- and dual-layer ones as well, get the fingerprint, if any, wiped away with a cleaning mechanism, and then eject the disc as soon as it has been cleaned. In that case, the optical disc apparatus should take time just to get the disc rotated by the spindle motor, find focus on the L0 layer, get the tracking control settled, and detect and wipe a fingerprint, if any, without following the conventional startup procedure including disc type recognition process and learning. As such preprocessing can be done in approximately 10 seconds per disc, the user can use the optical disc apparatus of the present invention to get ready for long recording more easily by wiping fingerprints away from several discs in advance, which is a novel way for using an optical disc apparatus.

If such a cleaning mode function is added, the date and the number of times of cleaning may be recorded on the management area of a just cleaned BD and a cleaning protect flag may also be added there. In that case, if the disc loaded has turned out to have been wiped at least once before in the cleaning mode, then it is determined, by reference to the cleaning protect flag, whether the disc needs to be further wiped or not.

As the user uses the cleaning mode intentionally, he or she will handle the cleaned discs carefully so that fingerprints or any other dirt will not be left on them again after several discs have been cleaned at a time and before those discs are used again. In a preferred embodiment of the present invention, if the optical disc loaded has turned out in the cleaning mode to have already been wiped at least once before and if it has been determined by reference to the cleaning protect flag that the disc need not be cleaned now, then the fingerprint detection process is omitted. In that case, the startup process on a multilayer BD can get done more quickly and thus makes this apparatus even handier for the users. Such a shortened startup process will be particularly advantageous for multilayer BDs with relatively small number of information storage layers such as three- or four-layer BDs, among other things.

Embodiment 2

Figure 10:
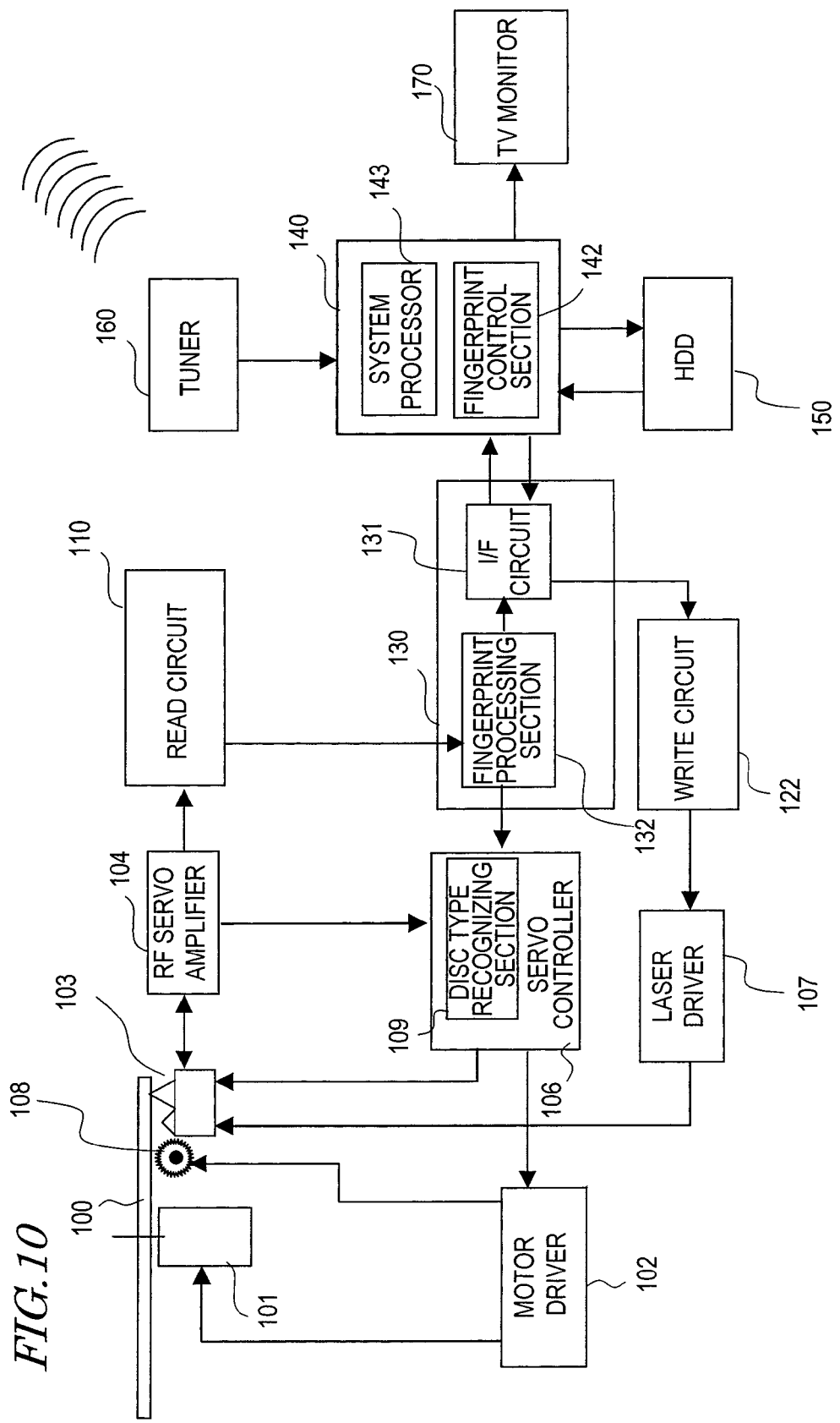
FIG. 10 A block diagram schematically illustrating the configuration of a multilayer BD/HDD (hard disk drive) recorder that performs the fingerprint detection processing function.

Hereinafter, a second specific preferred embodiment of an optical disc apparatus according to the present invention will be described with reference to FIG. 10, which is a block diagram schematically illustrating a configuration for a multilayer BD/HDD (hard disk drive) recorder that performs the fingerprint detection processing function. In FIG. 10, any component also shown in FIG. 5 is identified by the same reference numeral. The following description will be focused on configurations and operations that are unique to this second preferred embodiment, and the description of the same configurations and operations as what has already been described for the first preferred embodiment will be omitted herein.

The host 140 of this preferred embodiment includes a system processor 143 and a fingerprint control section 142 for storing a flag bit, which is used to control the fingerprint detection process, in a memory. The system processor 143 controls an optical disc controller 130, a hard disk 150, a digital tuner 160 and a TV monitor 170 that are all connected to the host 140.

The system processor 143 makes the fingerprint control section 142 and the I/F circuit 131 and the fingerprint processing section 132, which are built in the optical disc controller 130, operate in conjunction with each other. That is to say, the system processor 143 changes the types of processing according to the mode of operation and the intended use that the user currently selects (such as scheduling, dubbing, or direct recording), thereby realizing the best performance on a situation-by-situation basis.

Figure 11:
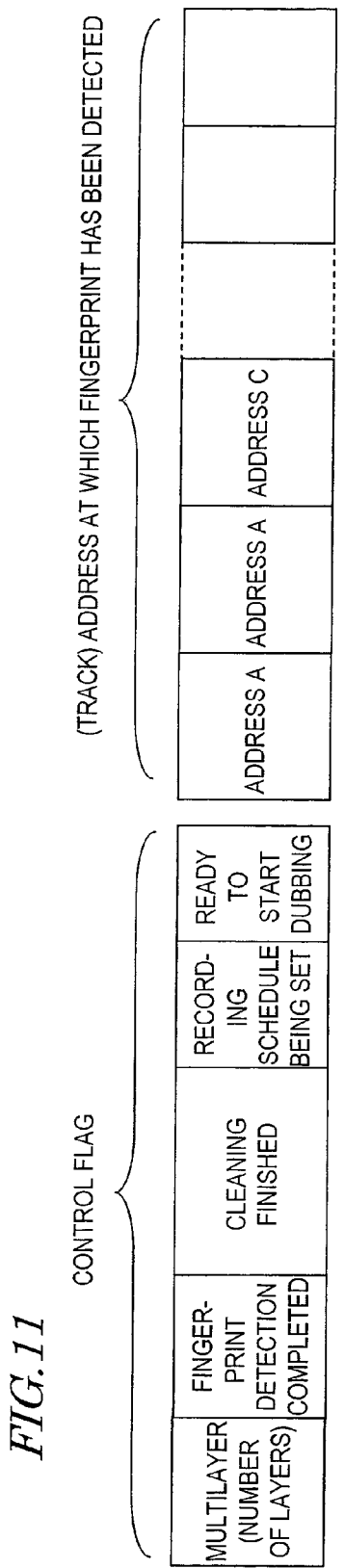
FIG. 11 Schematically illustrates pieces of information, representing results of a fingerprint detection process, which can be stored in an internal memory of the optical disc apparatus.

For example, suppose the user has turned OFF the optical disc apparatus that still has a multilayer BD, which has been loaded by the user into the apparatus and which has already been subjected to the fingerprint detection process, without ejecting the BD from the apparatus. In that case, no additional fingerprints will be newly left on the multilayer BD loaded. That is why a piece of information indicating whether there is a fingerprint on the disc or not and a piece of information indicating that the optical disc loaded is a multilayer BD are stored as flag bits in the memory. Those pieces of information represented by the flag bits may include a piece of information indicating that a fingerprint has been detected at an address X on the outer periphery of the multilayer BD loaded and a piece of information indicating that the cleaning is already finished. FIG. 11 schematically illustrates those pieces of information that can be stored in the memory in the optical disc apparatus.

By storing the information that has been obtained through the fingerprint detection process in the memory in the optical disc apparatus, such information about the result of fingerprint detection process, for example, which is stored in the memory, can be used again when the optical disc apparatus is manually turned ON and restarted next time or when the optical disc apparatus is restarted automatically to perform the scheduled recording operation. Then, there is no need to perform the fingerprint detection process all over again, and therefore, the re-startup process can get done in a shorter time. That is to say, in that case, there is no need to perform the multilayer disc type recognition process, the defect detection, and the cleaning when the optical disc apparatus is started again. According to the user's intended use and the mode of operation of the apparatus, however, what has not been done particularly for a single- or dual-layer BD before data was actually written on it may be carried out on a multilayer BD by changing the parameters of processing finely in terms of the learning time, the fingerprint detection process time, and the cleaning process time, for example.

In a preferred embodiment of the present invention, the following processing may be carried out.

(1) In cases of scheduled recording:

A multilayer disc type recognition process may be carried out and a multilayer flag may be turned ON in the flag bits. More specifically, if the BD loaded is a brand new disc and if the TV program that is going to be recorded as per the recording schedule has a running time of two (or four) hours or less and could be stored in a single layer (or in two layers), then the defect detection process is omitted and the apparatus prepares to perform the recording schedule. That is to say, the same processing as in a situation where the apparatus is loaded with a single- or dual-layer BD is carried out.

On the other hand, if the BD loaded is not brand new or if the TV program that is going to be recorded as per the recording schedule has a running time of more than two (or four) hours and could not be stored in a single layer (or in two layers), then the defect detection process is performed and the apparatus prepares to perform the recording schedule if no defect has been detected.

If any fingerprint has been detected as a result of the defect detection process, an alert message is posted. Unless the medium is replaced even after a predetermined amount of time has passed, the apparatus will start cleaning the disc automatically to wipe the fingerprint away and then prepare to perform the recording schedule.

(2) In cases of dubbing:

A multilayer disc type recognition process may be carried out and a multilayer flag may be turned ON. More specifically, if the BD loaded is a brand new disc, if the TV program that is going to be recorded as per the recording schedule has a running time of two (or four) hours or less and therefore the size of the data to be written should be smaller than the storage capacity of a single layer (or two layers), then the defect detection process is omitted and the apparatus prepares to perform the recording schedule. That is to say, the same processing as in a situation where the apparatus is loaded with a single- or dual-layer BD is carried out.

On the other hand, if the BD loaded is not brand new or if the TV program that is going to be recorded as per the recording schedule has a running time of more than two (or four) hours and therefore the size of the data to be written should be greater than the storage capacity of a single layer (or two layers), then the defect detection process is performed and the apparatus prepares to perform the recording schedule if no defect has been detected.

If any fingerprint has been detected as a result of the defect detection process, an alert message is posted. Unless the BD is replaced even after a predetermined amount of time has passed, the apparatus will start cleaning the disc automatically to wipe the fingerprint away and then prepare to perform the recording schedule.

(3) In cases of direct recording:

A multilayer disc type recognition process may be carried out and a multilayer flag may be turned ON to indicate that the optical disc loaded is a multilayer disc. After that, a defect detection process is performed immediately. And unless any defect such as a fingerprint has been detected, the apparatus will start the scheduled recording operation.

If any fingerprint has been detected as a result of the defect detection process, an alert message is posted. If the user wants to start recording the program anyway, the apparatus starts recording it. On the other hand, if he or she prefers cleaning the disc, then the apparatus cleans the disc and then starts recording the program. Unless the BD is replaced even after a predetermined amount of time has passed, the apparatus will start cleaning the disc automatically to wipe the fingerprint away.

An optical disc apparatus according to each of the preferred embodiments of the present invention described above includes a disc type recognizing section for determining whether the optical disc loaded is a first type of optical disc with less than three information storage layers or a second type of optical disc with three or more information storage layers. In this case, the second type of optical disc is a so-called "multilayer disc". In the preferred embodiments described above, if the optical disc loaded has turned out to be a first type of optical disc, no fingerprint detection process is performed. On the other hand, if the optical disc loaded has turned out to be a second type of optical disc, the fingerprint detection process is performed. By changing what to do as the read/write preprocessing depending on whether the number of information storage layers included in the optical disc loaded is less than a predetermined setting or equal to or greater than the setting, such processing that is not always indispensable for every optical disc can be skipped, and therefore, the read/write processing can be started quickly. Supposing the setting indicating whether the read/write preprocessing is necessary or not is identified by T, the setting T does not have to be three but may also be any other integer that is equal to or greater than three.

In addition, it is not always necessary to do the fingerprint detection process described above as the read/write preprocessing, either. Alternatively, the read/write preprocessing may also be a defect detection process for detecting any other kind of defects, not just fingerprints, and may even be a non-defect detection process. For example, if the optical disc loaded has turned out to be a first type of optical disc, then startup learning may be carried out on every information storage layer that the disc has. On the other hand, if the optical disc loaded has turned out to be a second type of optical disc (i.e., a multilayer disc), only some of the multiple information storage layers that the optical disc has may be selectively subjected to the startup learning process. For instance, if data that could be stored on two information storage layers is going to be written on an eight-layer BD, there is no need to carry out pre-startup learning on all of those eight information storage layers of the disc. In a preferred embodiment of the present invention, when the user decides what TV program should be recorded, it is estimated how much storage capacity needs to be used to record it. In response, the optical disc apparatus determines whether the optical disc loaded is a single- or dual-layer BD or a multilayer BD. If it is a multilayer BD, the apparatus decides on which information storage layer the program should be recorded and carries out learning on that information storage layer.

In a preferred embodiment of the present invention, if the optical disc loaded has turned out to be a second type of optical disc, at least one of the information storage layers of that optical disc is selected, according to the size of the data to be written on that optical disc, as the layer where the data is going to be written. Then, the startup learning process is carried out on that at least one information storage layer on which the data needs to be written.

Optionally, the read/write preprocessing to be carried out only when the optical disc loaded turns out to be a second type of optical disc (i.e., a multilayer disc) may also be processing for determining which of first and second writing modes, which will result in mutually different data storage densities, should be used to write the data.

That is to say, if the optical disc loaded has turned out to be a first type of optical disc, it may be determined that data needs to be written in the first writing mode. On the other hand, if the optical disc loaded has turned out to be a second type of optical disc, then data may be written in one of the first and second writing modes that has been selected by the user. And if data is going to be written in the first writing mode on the optical disc that has turned out to be a second type, it is preferred that the data be written on one of the information storage layers of that optical disc that is associated with the information storage layer of a first type of optical disc.

Hereinafter, other preferred embodiments of an optical disc apparatus according to the present invention, which performs various kinds of processing after a fingerprint has been detected, will be described. An optical disc apparatus according to each of the alternative preferred embodiments of the present invention to be described below has the configuration shown in FIGS. 5 and 6 and can detect a fingerprint on the optical disc.

Embodiment 3

A third specific preferred embodiment of an optical disc apparatus according to the present invention will be described. The optical disc apparatus as the third preferred embodiment of the present invention basically has the same configuration as the one shown in FIGS. 5 and 6 and can detect a fingerprint left on the optical disc. And the optical disc apparatus of this preferred embodiment has the function of notifying the user of the presence of a fingerprint on detecting one on the optical disc.

As described above, the fingerprint signal indicating whether or not a fingerprint has been detected is output from the fingerprint detector 116 shown in FIG. 5 to the fingerprint processing section 132 in the system controller 130. By reference to an address signal that has been provided by the demodulator 114 in the read circuit 110 by way of the error corrector 115, the fingerprint processing section 132 can find the start and end addresses of the fingerprint signal. And based on these addresses, the fingerprint processing section 132 can determine the size and location (i.e., the radial location on the optical disc) of the fingerprint that the light beam has passed.

Once the size and location of the fingerprint have been determined, the information about the size and location of the fingerprint is conveyed to the host 140 by way of the I/F circuit 131. If the optical disc apparatus is a recorder or a player, the host 140 is a so-called "backend". On the other hand, if the optical disc apparatus is an optical disc drive, the host 140 is a personal computer (PC) connected to a drive with an ATAPI (AT attachment packet interface), for example.

On getting the information about the size and location of the fingerprint, the host 140 may put, on a TV monitor 141 connected to a PC, the alert message that reads:

"A fingerprint with φ of 10 mm is left at a radial location of 35-40 mm on optical disc. As read/write operation may fail, please wipe it away or replace the disc"

Optionally, the host 140 may be a control unit that is built in an optical disc apparatus. In that case, the host 40 may display an error code, corresponding to the alert message, on the display area of the front panel of the optical disc apparatus. Alternatively, as soon as a fingerprint is detected, the host 140 may put out such an alert as a voice message to the user.

On receiving such a notification, the user can know how big the fingerprint on the optical disc is and where the fingerprint is located on the disc. Thus, the user can remove the fingerprint away appropriately by cleaning the designated portion of the disc with a fingerprint cleaner, for example, by himself or herself.

Embodiment 4

The optical disc apparatus of the third preferred embodiment described above notifies the user of the detection of a fingerprint by putting out an alert as either a text message or a voice message, thereby prompting him or her to replace the optical discs or clean the disc in question right away. However, such a notification is useless in a situation where a scheduled recording operation is performed while the user is usually away from home or a dubbing operation is performed at night after he or she has gone to bed. Thus, in order to cope with such a situation, on detecting a fingerprint, the optical disc apparatus of this preferred embodiment cleans the disc automatically with a wiping brush.

As described above, by using a fingerprint detector such as the one shown in FIG. 6, it can be determined whether a defect on the optical disc is a fingerprint or not, and if the defect turns out to be a fingerprint, the size of that fingerprint and its radial location on the optical disc can also be determined. That is why if the optical disc apparatus is equipped with a cleaner (such as a wiping brush) as in this preferred embodiment, the cleaner can be positioned almost perfectly with respect to the fingerprint on the optical disc. As a result, a portion of the optical disc with the fingerprint can be automatically cleaned selectively. According to this preferred embodiment, the fingerprint can be wiped away in a shorter time because the cleaning is never performed in vain on portions of the optical disc that are not spotted with fingerprints.

As shown in FIG. 5, the optical disc apparatus of this preferred embodiment includes a wiping brush 108 as a cleaner. More specifically, the wiping brush 108 is provided for the optical pickup 103 and has its operation controlled by the motor driver 102. Also, the wiping brush 108 is usually retracted so as to avoid contact with the optical disc 100 but sticks out toward the optical disc 100 only while cleaning the disc 100 and wiping the fingerprint away. And when the cleaning is over by wiping the fingerprint away, the wiping brush 108 is either shifted back to or retracted in its rest position.

Figure 12:
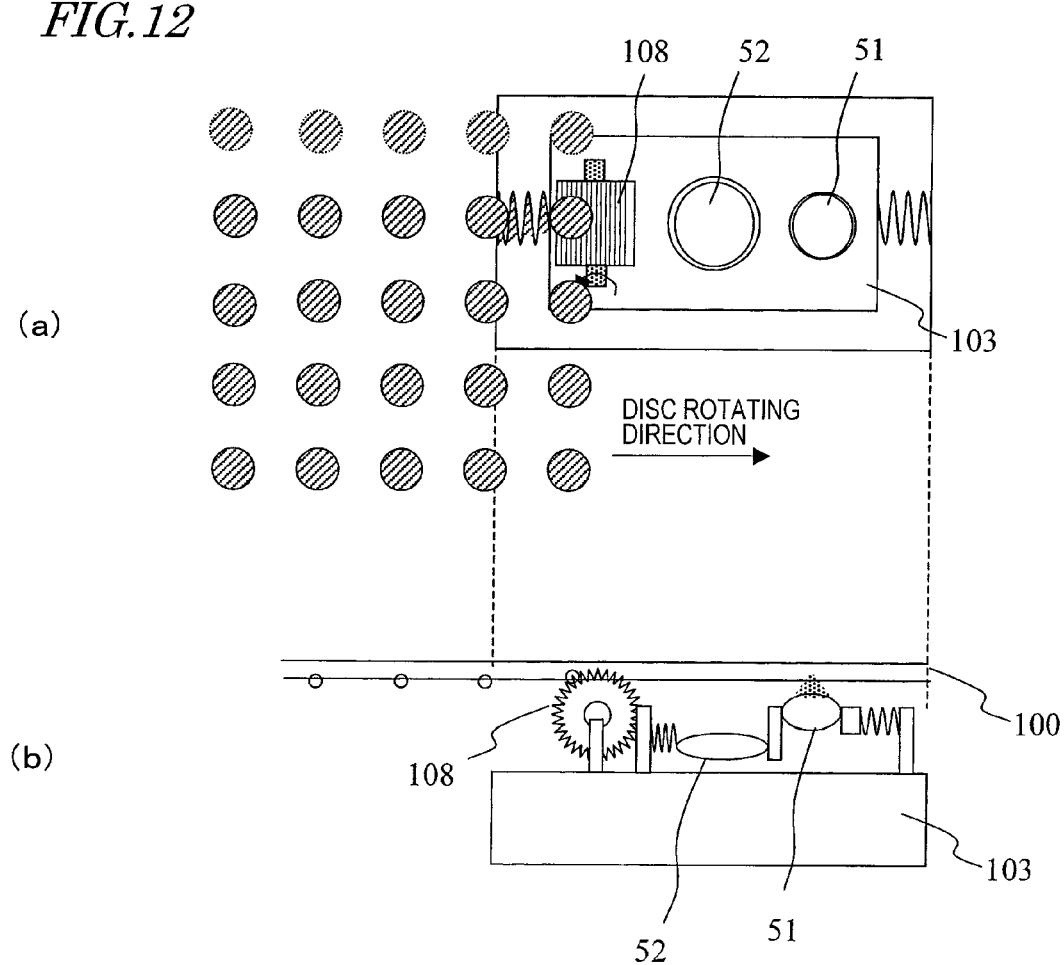
FIG. 12 Portion (a) of FIG. 12 is a plan view illustrating an exemplary configuration for an optical pickup with a fingerprint wiping brush 108 and portion (b) of FIG. 12 is a cross-sectional view thereof.

Portion (a) of FIG. 12 is a plan view illustrating the position of the optical pickup 103 with the fingerprint wiping brush 108 with respect to a fingerprint on an optical disc. Portion (b) of FIG. 12 is a cross-sectional view schematically illustrating an exemplary configuration of the optical pickup 103. In the optical pickup 103 of this preferred embodiment shown in portion (a) of FIG. 12, a BD lens 51 and a DVD lens 52 are arranged in this order such that the BD lens 51 is located ahead of the DVD lens 52 in the direction in which the optical disc rotates as indicated by the arrow. The wiping brush 108 is arranged on the other side of the DVD lens 52 opposite to the BD lens 51. That is to say, the fingerprint wiping brush 108 faces the same track (not shown) on the optical disc as the one that the BD lens 51 or the DVD lens 52 faces.

It should be noted that the respective tracks on the optical disc run parallel to each other in the direction in which the disc rotates in the vicinity of the optical pickup 103. In this preferred embodiment, the fingerprint wiping brush 108 is arranged near the BD lens 51 for use to detect a fingerprint. That is why just by performing a seek operation toward the location specified by the address of the fingerprint detected, the wiping brush 108 can be positioned easily.

Optionally, the size, shape and material of the wiping brush (or cleaner) 108 may be designed and determined just for the purpose of wiping away nothing but a fingerprint properly. To wipe a fingerprint away, at least a predetermined stress is required. That is why it is effective to form the brush 108 in a roller shape and use a viscous material to make the brush 108 as shown in portion (b) of FIG. 12. Alternatively, the tips of the brush may be rounded or a few pieces of relatively thick cloth may be stacked one upon the other.

The wiping operation is preferably performed for a predetermined amount of time or a predetermined number of times (i.e., with the disc rotated the predetermined number of times) with the focus control suspended once and with the cleaner 108 brought into contact with the optical disc 100. And when the predetermined amount of time passes, the focus control on the same location is turned ON again and that location is retraced until the sudden steep drop of the RF signal level due to the presence of a fingerprint no longer occurs (i.e., until no signal representing a fingerprint is detected anymore). When it is confirmed that the fingerprint has been wiped away successfully, the cleaner is shifted to the next radial location where another fingerprint has been detected. In this manner, the fingerprints can be removed just as intended and the reliability of the read/write operations can be increased significantly.

Alternatively, the optical disc apparatus may be designed so as to clean the optical disc 100 with the focus servo ON by arranging the cleaner 108 at the front end of the optical pickup 103 in its traveling direction with respect to the optical disc 100. In that case, no sooner has the optical disc 100 been cleaned a predetermined number of times of rotation than it can be determined, by the level of a fingerprint signal obtained from the RF signal, whether the fingerprint has been wiped away or not.

Anyway, by arranging the BD lens 51 and the wiping brush 108 together on the base of the optical pickup 103 as described above, automatic cleaning can be done at a reduced cost by integrating those members together with the base and without interfering with the size reduction of the apparatus.

Hereinafter, it will be described with reference to FIG. 5 in what procedure the cleaner wipes the fingerprint away.

Specifically, if a fingerprint has been detected on the optical disc 100, the fingerprint processing section 132 of the system controller 130 shown in FIG. 5 outputs a signal to the optical pickup 103 and the motor driver 102 by way of the servo controller 106.

By reference to the address signal that has been provided by the demodulator 114 in the read circuit 110 by way of the error corrector 115, the fingerprint processing section 132 can find the start and end addresses of the fingerprint signal. As a result, the fingerprint processing section 132 can determine the size and the radial location of the fingerprint that the light beam has passed. Once the size and location of the fingerprint have been determined, the fingerprint processing section 132 provides the information about the fingerprint (which will be referred to herein as "fingerprint information") for the servo controller 106. On receiving the fingerprint information, the servo controller 106 moves the optical pickup 103 and a traverse motor (not shown) that drives the optical pickup 103 in the radial direction, thereby bringing the wiping brush 108 on the optical pickup 103 into contact with the optical disc at the radial location where the fingerprint has been detected. Thereafter, the servo controller 106 gets the wiping brush 108 turned reversely to the direction of rotation of the optical disc 100 by the motor driver 102, thereby wiping away the fingerprint that has been left on the surface of the optical disc 100.

Even without turning the wiping brush 108 reversely, the fingerprint can also be wiped away just by getting the optical disc 100 rotated by the optical disc motor 101 and letting the wiping brush 108 stick out and contact with the optical disc 100. In that case, the optical disc 100 preferably continues being rotated while keeping contact with the wiping brush 108 for a longer time compared to the situation where the fingerprint is wiped away by turning the wiping brush 108 reversely. Even so, since it is already known exactly where on the optical disc 100 the fingerprint is located, the fingerprint can be wiped away much more quickly compared to a situation where the optical disc 100 needs to be cleaned entirely.

As described above, a conventional optical disc apparatus cannot determine whether a defect detected on an optical disc is a fingerprint or something else such as a scratch or dust. That is why it has been proposed that if any defect has been found on an optical disc, the optical disc be cleaned entirely to remove the dust, if any, from the optical disc. In that case, however, the material and shape of the cleaner or brush should be determined so as to remove dust properly. Thus, it is difficult to remove a fingerprint sufficiently with such a cleaner or brush. Consequently, the conventional automatic cleaning technique cannot guarantee that a fingerprint can be removed properly.

However, according to the present invention, a fingerprint located and any other defect detected such as dust and scratches can be clearly distinguished from each other. That is why by providing a cleaner or brush, which is specially designed so as to remove a fingerprint perfectly, for the optical disc apparatus, a fingerprint, if detected any, can be removed by proper cleaning. In addition, according to this preferred embodiment, the fingerprint can be located exactly and it can be determined whether or not the fingerprint has been removed perfectly. That is why only a portion of the disc spotted with a fingerprint can be wiped with a specially designed fingerprint cleaner over and over again until the fingerprint disappears completely. As a result, the fingerprint can be removed quickly.

Embodiment 5

Compared to a normal data area (which may be a TV program recording area) on an optical disc, a special-purpose area thereof, called a "management area" (which is often arranged around the inner edge of a disc), should guarantee a higher degree of reliability for the data stored there (i.e., management information). That is to say, if the management information were written on the management area spotted with a fingerprint and became unreadable after that, then the program data, the entire TV program data, or even every data on the optical disc could become no longer readable.

Thus, the optical disc apparatus of this preferred embodiment checks the management area for any fingerprints before management information is added to, updated in, the management area during the startup process. More specifically, the optical disc is rotated to perform a focus servo operation and a tracking servo operation and carry out various types of learning. After address information has been obtained in this manner, the optical pickup is moved to the management area to scan the entire management area with a light beam.

In this case, by supplying the output of the RF servo amplifier 104 shown in FIG. 5 to the fingerprint detector 116, it is determined, by the method described above, whether or not there is a fingerprint. If no fingerprint has been detected in either a portion of the management area that is broad enough to write the management data on or the entire management area, then the output signal of the fingerprint detector 116 is not activated. That is why the fingerprint processing section 132 of the system controller 130 gets the I/F circuit 131, the formatter section 123, the modulator 124, the D/A converter 125 and the laser driver 107 perform a write operation to add or update the management data to/in that management area.

On the other hand, if any fingerprint has been detected in the management area, then the output signal of the fingerprint detector 116 is also activated. In response to that signal as a trigger, the fingerprint processing section 132 sends an instruction signal to the I/F circuit 131 and gets an alert message that prompts the user to wipe the fingerprint away posted by the host 140. Or the fingerprint processing section 132 sends an instruction signal to the servo controller 106 and gets the fingerprint wiped away automatically by the motor driver 102. Alternatively, instead of wiping the fingerprint away in this manner, the management information may also be written on a portion of the management area with no fingerprints (i.e., on an alternative area). The management area has a much smaller two-dimensional area than the other data area. That is why the fingerprint detection or the automatic fingerprint cleaning on the management area can be done in a shorter time.

It should be noted that the management area could include an area where management information was written during the manufacturing process of the disc and cannot be altered by the user. For example, at a particular location that is defined by the physical standard of the optical disc, management information could be stored as an embossed pattern (or pits) or could be represented by varying frequencies or phase modulations of a wobbling track shape. Even before those pieces of management information are read, the management area is also preferably subjected to the fingerprint check. If any fingerprint has been detected there, then the fingerprint is preferably removed before the management information is read out.

In the preferred embodiments described above, the distance between any pair of multiple information storage layers is supposed to be the same everywhere in a single optical disc for the sake of simplicity. Actually, however, the distance could vary from one interval to another to reduce the crosstalk between those layers or to ensure a sufficiently high transmittance. But the present invention is also applicable to such a multilayer disc with varied layer-to-layer distances and is never limited by such layer-to-layer distances.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2008-267026 filed on Oct. 16, 2008 and No. 2009-227813 filed on Sep. 30, 2009, the entire contents of which are hereby incorporated by reference.

INDUSTRIAL APPLICABILITY

An optical disc apparatus according to the present invention can detect more accurately a fingerprint that has been left on a BD or any other next-generation optical disc, which is more sensitive to fingerprints than a DVD is, and can perform a read/write operation more appropriately on the optical disc. That is why the present invention can be used effectively in various types of optical discs on which information can be stored at higher densities than on DVDs.

| Reference Signs List | |
| --- | --- |
| 10a | light beam spot on BD |
| 10b | light beam spot on DVD |
| 20 | fingerprint dot |
| 30 | disc surface |
| 32 | BD's information storage layer |
| 34 | DVD's information storage layer |
| 51 | BD lens |
| 52 | DVD lens |
| 100 | optical disc |
| 101 | optical disc motor |
| 102 | motor driver |
| 103 | optical pickup |
| 104 | RF servo amplifier |
| 106 | servo controller |
| 107 | laser driver |
| 108 | fingerprint wiping brush |
| 109 | disc type recognizing section |
| 110 | read circuit |
| 111 | waveform equalizer |
| 112 | binarizer |
| 113 | PLL circuit |
| 114 | demodulator |
| 115 | error corrector |
| 116 | fingerprint detector |
| 122 | write circuit |
| 123 | formatter section |
| 124 | modulator |
| 125 | D/A converter |
| 130 | system controller |
| 131 | I/F circuit |
| 132 | fingerprint processing section |
| 140 | host |
| 141 | TV monitor |

The invention claimed is:

1. An optical disc apparatus comprising:
a motor for rotating an optical disc loaded;
a light source for emitting a light beam;
a lens for converging the light beam onto the optical disc; and
a control section for controlling the operations of the motor, the light source, and the lens, the control section performing read/write preprocessing before starting to read or write data from/on the optical disc,
wherein the control section includes a disc type recognizing section for determining, by irradiating the optical disc with the light beam using the light source and the lens, whether the optical disc loaded is a first type, of which the number of information storage layers is less than a setting T (where T is an integer that is greater than two), or a second type, of which the number of information storage layers is equal to or greater than the setting T, and
wherein the control section determines the read/write preprocessing depending on whether the optical disc loaded has turned out to be the first type or the second type.

2. The optical disc apparatus of claim 1, wherein the preprocessing includes a defect search, and
wherein if the optical disc loaded has turned out to be the first type, the control section does not perform the defect search, but
if the optical disc loaded has turned out to be the second type, the control section does perform the defect search.

3. The optical disc apparatus of claim 1, wherein the preprocessing includes startup learning, and
wherein if the optical disc loaded has turned out to be the first type, the control section carries out the startup learning on every information storage layer of the optical disc loaded, but
if the optical disc loaded has turned out to be the second type, the control section carries out the startup learning on only selected one(s) of the information storage layers of the optical disc loaded.

4. The optical disc apparatus of claim 3, wherein if the optical disc loaded has turned out to be the second type, the control section selects at least one of the information storage layers of that optical disc, where data needs to be written, according to the size of the data to be written on the optical disc, and carries out the startup learning on the at least one information storage layer on which the data needs to be written.

5. The optical disc apparatus of claim 1, wherein the preprocessing is a process for determining which of first and second writing modes, which will result in two different data storage densities, needs to be adopted to write data, and
wherein if the optical disc loaded has turned out to be the first type, the control section determines to write the data in the first writing mode, but
if the optical disc loaded has turned out to be the second type, then the control section writes the data in one of the first and second writing modes that has been selected by the user of the apparatus.

6. The optical disc apparatus of claim 5, wherein if the optical disc loaded has turned out to be the second type and if the data needs to be written in the first writing mode, then the data is written on at least one of the information storage layers of the second type of optical disc that is associated with the information storage layer(s) of the first type of optical disc.

7. The optical disc apparatus of claim 1, wherein the disc type recognizing section determines the type of the optical disc loaded before the startup learning is carried out on the information storage layer.

8. The optical disc apparatus of claim 2, wherein when the defect search is performed, a fingerprint detection process is carried out to determine whether or not any fingerprint is present on the surface of the optical disc loaded.

9. The optical disc apparatus of claim 8, further comprising an internal memory that stores results of the fingerprint detection process,
   wherein if the apparatus has been turned OFF without ejecting the optical disc loaded, the results of the fingerprint detection process are stored in the memory and will be used when the apparatus is turned ON again, thereby omitting the fingerprint detection process.

10. The optical disc apparatus of claim 8, wherein if the optical disc loaded has already been wiped in advance in a cleaning mode, then the apparatus determines, by checking a cleaning protect flag that has been recorded on the optical disc, whether or not the optical disc needs to be further wiped and omits the fingerprint detection process if the disc no longer needs to be wiped.

11. The optical disc apparatus of claim 8, wherein if the fingerprint detecting section has confirmed the presence of a fingerprint on the optical disc, the user is alerted to the presence either visually or audibly.

12. The optical disc apparatus of claim 8, further comprising a fingerprint wiping section,
   wherein if the fingerprint detecting section has confirmed the presence of a fingerprint on the optical disc, the fingerprint wiping section wipes the fingerprint away.

13. The optical disc apparatus of claim 8, further comprising a writing section,
   wherein if the fingerprint detecting section has detected a fingerprint on a management area of the optical disc, the writing section stores data that should be written on the management area somewhere else where there are no fingerprints.

14. The optical disc apparatus of claim 12, wherein the fingerprint wiping section includes a retractable brush and wipes the fingerprint away with the brush sticking out while cleaning the disc.

* * * * *